US012715240B2

(12) United States Patent
Lee

(10) Patent No.: US 12,715,240 B2
(45) Date of Patent: Aug. 25, 2026

(54) WHEEL AND LEG TRANSFORMABLE ROBOT WITH SUSPENSION AND AUTONOMOUS NAVIGATION

(71) Applicant: THE TEXAS A&M UNIVERSITY SYSTEM, College Station, TX (US)

(72) Inventor: Kiju Lee, College Station, TX (US)

(73) Assignee: The Texas A&M University System, College Station, TX (US)

( * ) Notice: Subject to any disclaimer, the term of this patent is extended or adjusted under 35 U.S.C. 154(b) by 396 days.

(21) Appl. No.: 18/285,166

(22) PCT Filed: Mar. 31, 2022

(86) PCT No.: PCT/US2022/022818

§ 371 (c)(1),
(2) Date: Sep. 29, 2023

(87) PCT Pub. No.: WO2022/212701

PCT Pub. Date: Oct. 6, 2022

(65) Prior Publication Data

US 2024/0181805 A1 Jun. 6, 2024

Related U.S. Application Data

(60) Provisional application No. 63/169,996, filed on Apr. 2, 2021.

(51) Int. Cl.

| | |
|---|---|
| ***B60B 15/06*** | (2006.01) |
| ***B60B 15/16*** | (2006.01) |
| ***B62D 57/02*** | (2006.01) |
| ***G05D 1/242*** | (2024.01) |
| ***G05D 1/243*** | (2024.01) |
| ***G05D 1/248*** | (2024.01) |
| ***G05D 109/15*** | (2024.01) |

(52) U.S. Cl.

CPC .............. *B60B 15/06* (2013.01); *B60B 15/16* (2013.01); *B62D 57/02* (2013.01); *G05D 1/242* (2024.01); *G05D 1/243* (2024.01); *G05D 1/248* (2024.01); *G05D 2109/15* (2024.01)

(58) Field of Classification Search

CPC ......... B60B 15/06; B60B 15/16; B60B 15/12; B60B 19/04; B60B 2900/351; B60B 2900/551; B62D 57/02; B62D 57/024; B62D 57/022; G05D 1/242; G05D 1/243; G05D 1/248; G05D 2109/15

See application file for complete search history.

(56) References Cited

U.S. PATENT DOCUMENTS

2011/0155484 A1 6/2011 Gong
2013/0081885 A1 4/2013 Connor

FOREIGN PATENT DOCUMENTS

CN 104057990 A 9/2014

*Primary Examiner* — Russell Frejd
(74) *Attorney, Agent, or Firm* — Jackson Walker LLP

(57) ABSTRACT

Aspects of the disclosure relate to a robot. The robot includes a body and a wheel assembly coupled to the body. The wheel assembly includes a central hub and a central gear coupled to the central hub. A plurality of legs are coupled to the central hub. The plurality of legs are operatively coupled to the central gear such that the central gear drives the plurality of legs between a closed position and an open position. A motor is coupled to the body and coupled to the wheel. A suspension system is coupled to the wheel assembly. An autonomous guidance system is coupled to the motor.

17 Claims, 17 Drawing Sheets

202(1)
Δh
212

MOVING DIRECTION
202(1)
212
Δh

WHEEL AND LEG TRANSFORMABLE ROBOT WITH SUSPENSION AND AUTONOMOUS NAVIGATION

CROSS-REFERENCE TO RELATED APPLICATIONS

This application claims priority to, and incorporates by reference the entire disclosure of, U.S. Provisional Patent Application No. 63/169,996, filed on Apr. 2, 2021.

STATEMENT REGARDING FEDERALLY SPONSORED RESEARCH

This invention was made with government support under grant number HR00112020037 awarded by the Defense Advanced Research Projects Agency. The government has certain rights in the invention.

TECHNICAL FIELD

The present disclosure relates generally to a robot having transformable wheels and more particularly, but not by way of limitation, to a robot having autonomous drive controls and suspension.

BACKGROUND

This section provides background information to facilitate a better understanding of the various aspects of the disclosure. It should be understood that the statements in this section of this document are to be read in this light, and not as admissions of the prior art.

Autonomous mobile robots moving in contact with the ground can perform a broad range of tasks, such as surveillance, carry or transport, search-and-rescue, and exploration. Common methods of terrestrial locomotion in these robots include wheels, legs, and tracks. Wheels enable the simplest, yet most efficient way of locomotion on relatively smooth and flat surfaces while exhibiting limitations in traversing rough terrains or obstacles. Increasing the wheel size would improve overall locomotion performance while also increasing the size and weight of the robot and possibly limiting accessibility to confined spaces. Compared to the size of the wheels, the climbable obstacle height would still remain relatively small. External factors, such as the surface geometry and friction between the wheel and the contact surface, are also important contributing factors to the overall mobility. These external conditions, however, are difficult to predict unless the robot operates in a well-known environment. Legs, on the other hand, typically outperform wheels in challenging terrain conditions but often suffer from mechanical complexities and control difficulties. Tracks or crawling mechanisms have advantages over wheels or legs on soft terrains and slopes, while their operational principles can be as simple as wheels. However, the increased mechanical complexity often limits their use to low-speed applications.

Combining two or more locomotion methods, a hybrid system aims to improve its performance especially when the target application involves diverse and unknown terrain conditions. One way to achieve this is to equip a robot with more than one locomotion system. For example, robots with both wheels and legs can selectively use one of them depending on the terrain type. The two can either be completely separated or connected through the same motor shafts. Some other robots are installed with two wheels and two legs to overcome the speed limitations commonly observed in legged robots while addressing locomotion changes in wheeled robots. Combining tracks and wheels could also achieve improved locomotion performance.

Another way to achieve hybrid locomotion is to mechanically integrate more than one strategy. One example is to attach wheels at the distal tips of individual legs. A hybrid leg-wheel-track ground robot used two of these in addition to a track-based locomotion system to allow the robot to traverse over obstacles and staircases. Another robot has four legs with wheels at the tips—each leg is a 6 degree-of-freedom (dof) Stewart platform—keeping the chassis stable on rough terrains. There are also wheeled mechanisms with legs attached to the rims of the individual wheels that can be folded or stretched out. Whegs are spoke wheels capable of generating leg-like locomotion while operated as wheels. This mechanism achieves the speed and simplicity of wheels and the versatility of the legs.

Transformable hybrid mechanisms allow the system to change the mode of locomotion during operation. These mechanisms can be broadly divided into two categories based on their transformation strategies: active or passive. Active transformation requires a dedicated actuator(s) to trigger the transition between the two or more locomotion modes. Passive transformation is typically triggered by external and/or internal factors without involving any additional actuator. An active mechanism allows the system to use a specific locomotion method but requires increased system complexity in both hardware and software. A passive mechanism does not necessarily increase the system complexity, but it typically involves uncertainties in transition behavior. Due to the expected advantages and relative mechanical simplicity, wheel-and-leg transformation has been most widely explored. Existing active mechanisms have adopted several actuation strategies. One involves multiple leg segments evenly arranged around a disc, which is connected to an axial shaft. By pulling or pushing this disc, the leg segments can correspondingly open or close. This mechanism has also been applied to origami wheels. Another strategy adopts stick-shaped legs, which can remain hidden in the wheels or extended. A wheel comprised of two half-circle legs can either be folded into a semicircular wheel; or deviate radially and form two legs.

A commonly adopted three or four-leg wheel design consists of arciform lobes connected through linkages that control the lobes to fold or extend. Deformable wheels could selectively determine their locomotion method among the three, i.e., the rotary motion of the wheel, wheel shape switching between circle and ellipse, and track motion of the rubber belt at the outer surface of the wheel. While most existing active mechanisms use a motor to trigger the transformation, some use wire-driven actuation for simplicity and light-weight. Many active transformable mechanisms contain an actuator in the wheel itself, requiring power and control signals to be transmitted from the main chassis. A slip-ring device was adopted for this in several previous studies. Compared to active mechanisms, relatively fewer passive ones exist. Wheel Transformer consists of two normal legs and one triggering leg assembled with a transmitting disc and a spoke frame. The legs can open passively when an external frictional force acts on the triggering leg. A passive morphing wheel consists of a main frame and three leg segments. In this design, springs and magnets keep the legs closed when the robot stops or moves at a low speed, and wheel-to-leg transformation is triggered when the robot drives at a high speed. Another existing design consists of three leg segments, three links, an internal spoke frame, and an external spoke frame. The leg segments are connected to the inner spoke frame directly and outer spoke frame through the links. Transformation is triggered by external surface conditions, such as existence of an obstacle. Another design consists of three scissor-chain legs and two discs in the middle, forming a rotating pair. The mechanism is passively transformable by connecting one side of the scissor-chain to a leg and the other side to the inner disc.

SUMMARY

Aspects of the disclosure relate to a robot. The robot includes a body and a wheel assembly coupled to the body. The wheel assembly includes a central hub and a central gear coupled to the central hub. A plurality of legs is coupled to the central hub. The plurality of legs is operatively coupled to the central gear such that the central gear drives the plurality of legs between a closed position and an open position. A motor is coupled to the body and coupled to the wheel. A suspension system is coupled to the wheel assembly. An autonomous guidance system is coupled to the motor.

This summary is provided to introduce a selection of concepts that are further described below in the Detailed Description. This summary is not intended to identify key or essential features of the claimed subject matter, nor is it to be used as an aid in limiting the scope of the claimed subject matter.

BRIEF DESCRIPTION OF THE DRAWINGS

A more complete understanding of the subject matter of the present disclosure may be obtained by reference to the following Detailed Description when taken in conjunction with the accompanying Drawings wherein:

FIGS. 6A-5E illustrate embodiments of a wheel according to aspects of the disclosure;

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Presented is a new adaptive wheel-and-leg transformable robot for versatile multi-terrain mobility. The robot is equipped with passively transformable wheels, where each wheel includes a central gear and multiple leg segments with embedded spring suspension for shock reduction. These wheels enable the robot to traverse various terrains, obstacles, and stairs, while retaining the simplicity in primary control and operation principles of conventional wheeled robots. The chassis dimensions and the location of the center of gravity were determined via multi-objective design optimization aimed at minimizing the weight and maximizing the pitch angle of the robot for obstacle climbing. The design variables associated with the transformable wheels were selected via simulations. Based on the results from this optimization process, an embedded sensing and control system was developed. Experiments showed that the spring suspension on the wheels effectively reduced the vibrations while walking and verified the robot's versatile locomotion capabilities. Results from physical experiments were highly consistent with the simulations, proving the potential utility of the simulator for selecting optimal wheel designs for target locomotion objectives.

Figure 1:
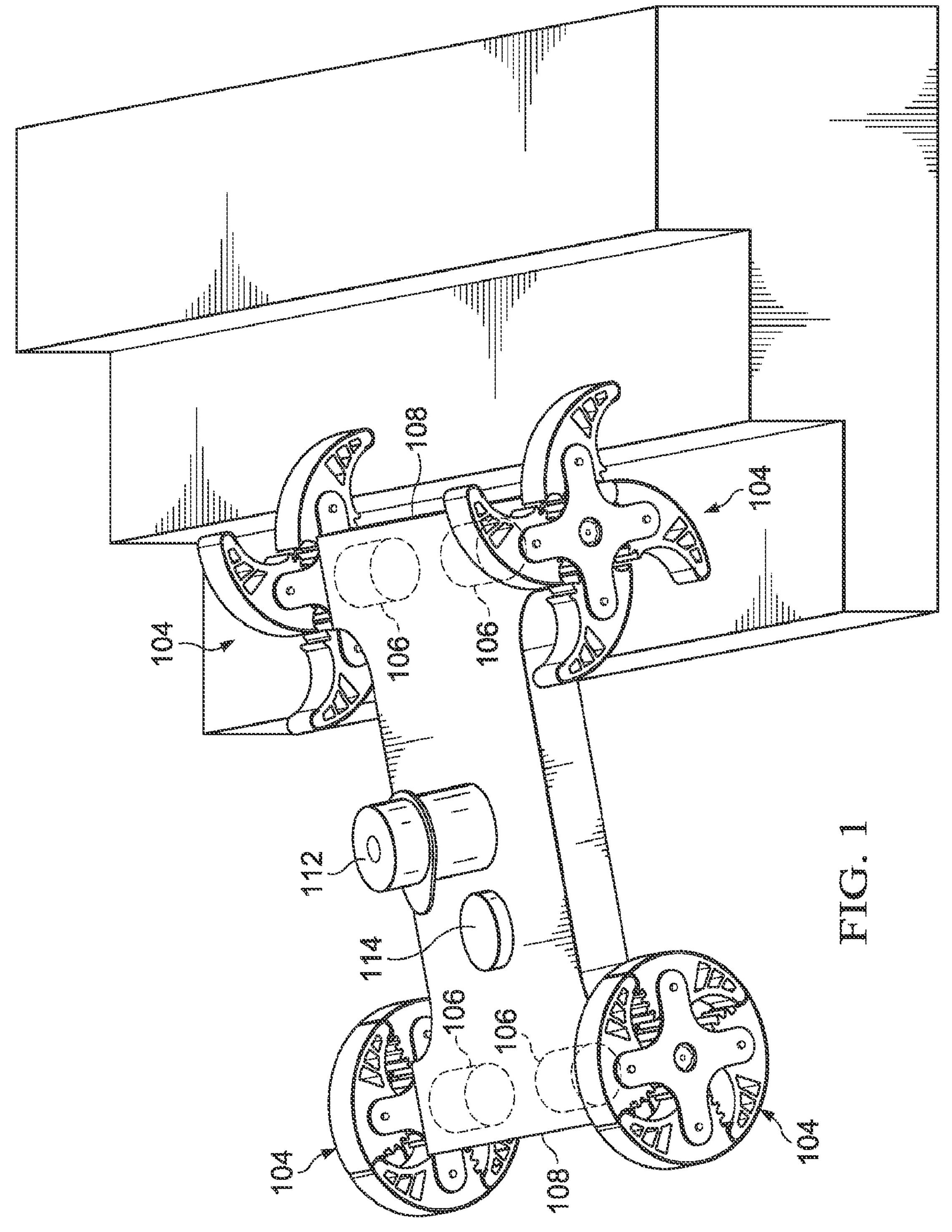
FIG. 1 is a perspective view of a wheel-and-leg autonomous robot according to aspects of the disclosure.

FIG. 1 is a perspective view of a wheel-and-leg autonomous robot 100. Robot 100 includes a body 102 and a plurality of wheel assemblies 104. By way of example, body 102 may have dimensions of about 720 mm(L)×590 mm(W)×300 mm(H), weighing about 11 kg. The size of body 102 may be customized as needed for different applications. As shown in FIG. 1, robot 100 includes four wheel assemblies 104; however, various embodiments of robot 100 could include more or fewer wheel assemblies 104. For example, the robot 100 could include two wheel assemblies 104, three wheel assemblies 104, four wheel assemblies 104, or six or more wheel assemblies 104. Each wheel assembly 104 is operatively coupled to a motor 106 such that each wheel assembly 104 is controlled independent of other wheel assemblies 104. In other embodiments, multiple wheel assemblies 104 could be coupled to a single motor 106 such that robot 100 could have, for example, a front-wheel-drive configuration, a rear-wheel drive configuration, or an all-wheel drive configuration.

Still referring to FIG. 1, robot 100 includes an autonomous guidance system. The autonomous guidance system includes a front camera 108, a rear camera 110, a LiDAR device 112, and a GPS receiver 114. Front camera 108, rear camera 110, LiDAR device 112, and GPS receiver 114 are electrically coupled to a microcontroller and a power source (e.g., see FIG. 6). The autonomous guidance system is enabled by onboard sensing, processing, and wireless communication capabilities. Robot 100 has potential for many areas, such as agriculture, space exploration, surveillance, and urban military applications.

The locomotion system of robot 100 includes wheel assemblies 104 that are passively transformable wheels. Passive is used to describe wheels that can transition from wheels to legs (and vice versa) based on the driving direction and environmental conditions. Each assembly 104 is a geared, transformable wheel mechanism (e.g., see FIGS. 2-6 for examples). This design includes a central gear, leg segments with partial gears, and two spoke frames. When the central gear rotates in a first direction, the legs open until a mechanical lock is reached. As the central gear continues to rotate in the first direction under sufficient friction, even at a low speed, the entire mechanism turns in the first direction with the legs open. When the central gear rotates in the opposite direction, the legs close or remain closed in a seamless circular shape and continue to roll in the opposite direction. Each assembly 104 is mechanically simple with only a few moving components. The design variables, including the ratio of the partial gears on the legs to the central driving gear ($\rho=r_2/r_1$), the number of legs ($n_{leg}$), and the wheel radius ($R=r_1+2r_2$), are customizable.

Robot 100 is a fully functional robotic platform developed for real-world tactical applications. To carry necessary payloads and conduct sensing and processing required for autonomous navigation, the robot inevitably becomes much larger and heavier. Physical scale-up is expected to result in increased vibrations and shocks during legged locomotion. In addition, overall locomotion performance and behavior are affected by the dimensions of robot 100 as well as the design of assemblies 104. For shock reduction, torsional springs are embedded into each assembly 104 (See FIGS. 3-4). A multidisciplinary optimization approach is adopted for determining the overall chassis dimensions and the location of the center of gravity to minimize the weight—and thus torque requirement—and maximize the robot's achievable pitch angle for obstacle climbing.

Figure 2A:
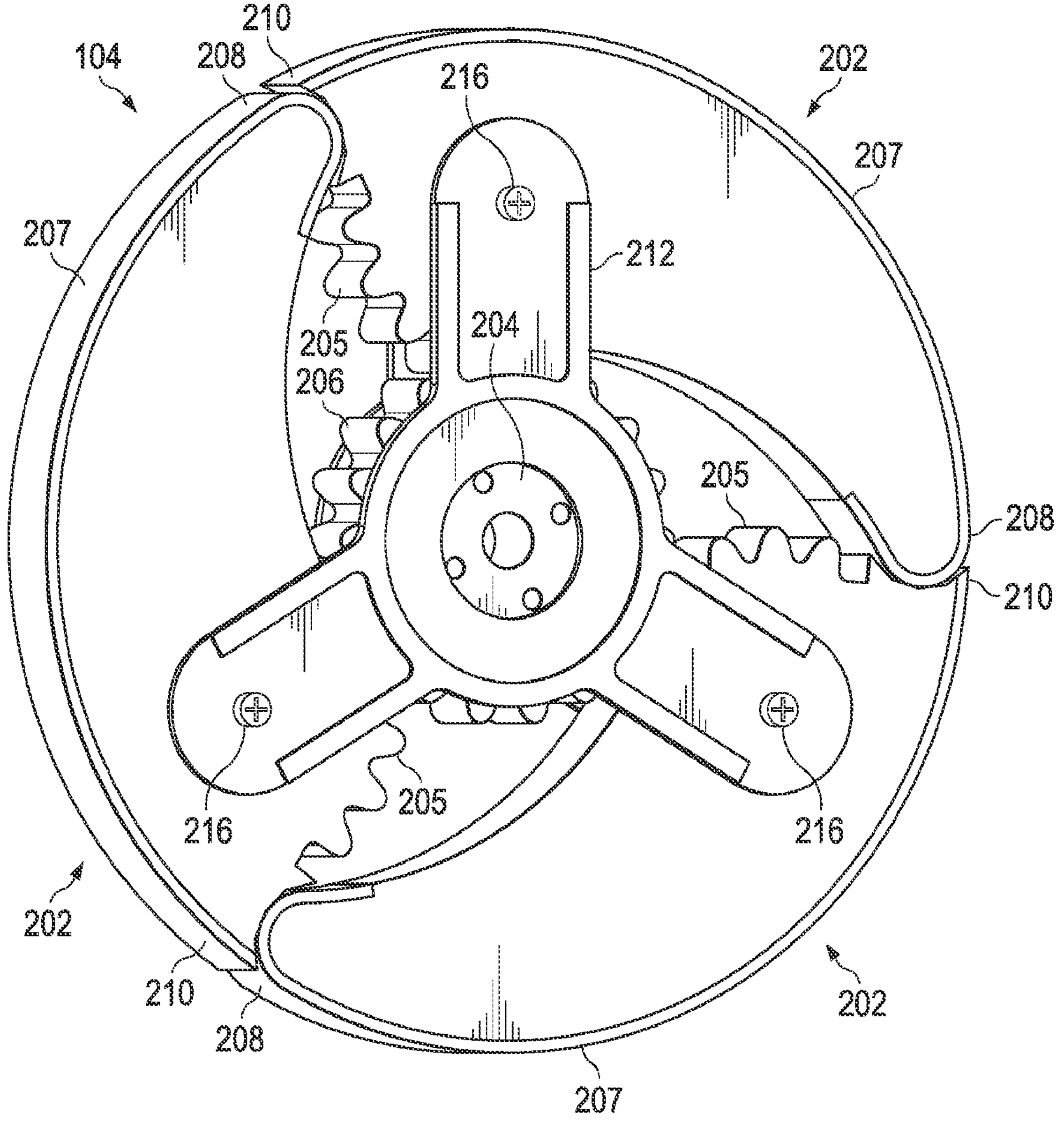
FIG. 2A is a perspective view of a wheel assembly in a closed configuration according to aspects of the disclosure.
Figure 2B:
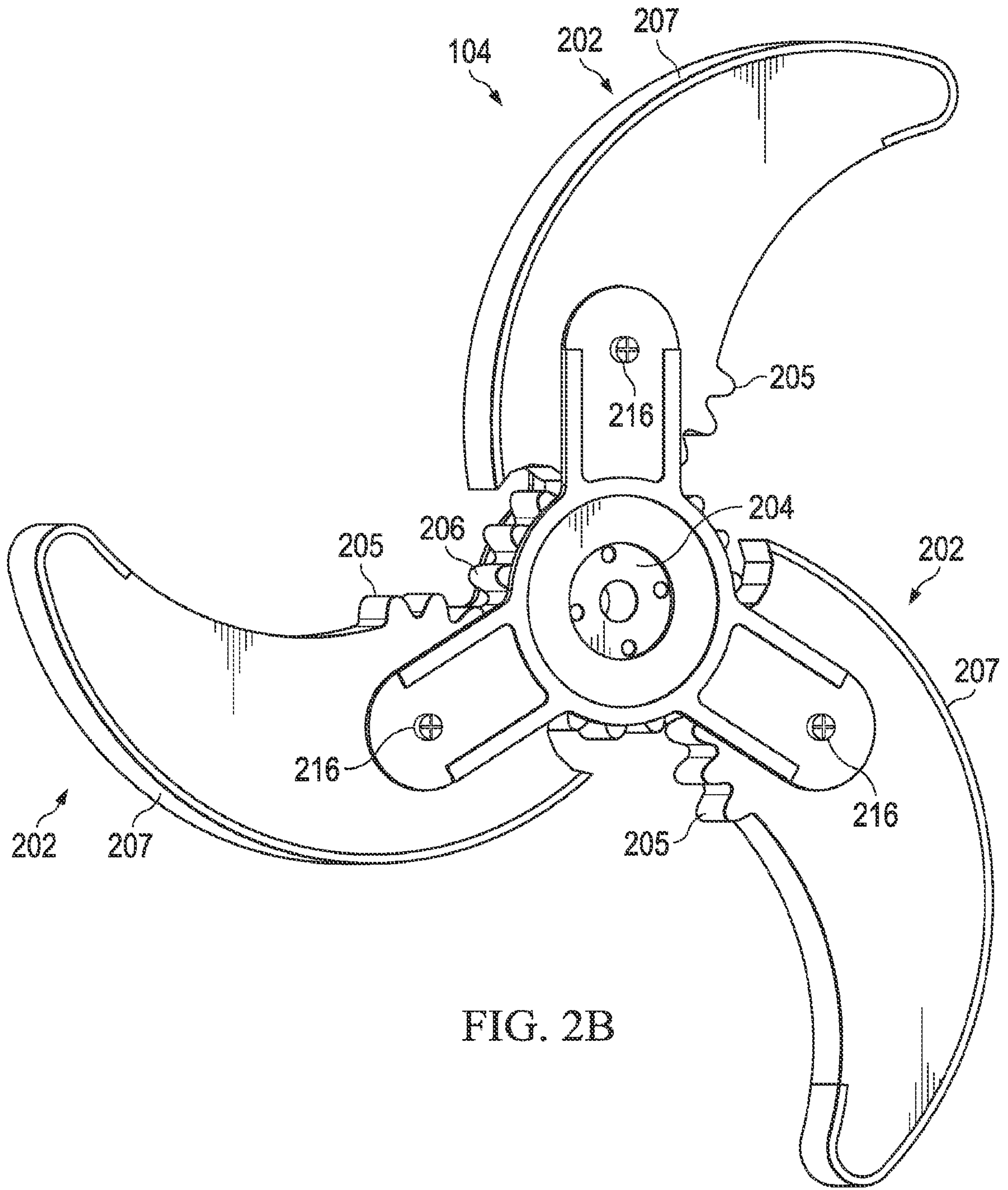
FIG. 2B is a perspective view of a wheel assembly in an open configuration according to aspects of the disclosure.
Figure 2C:
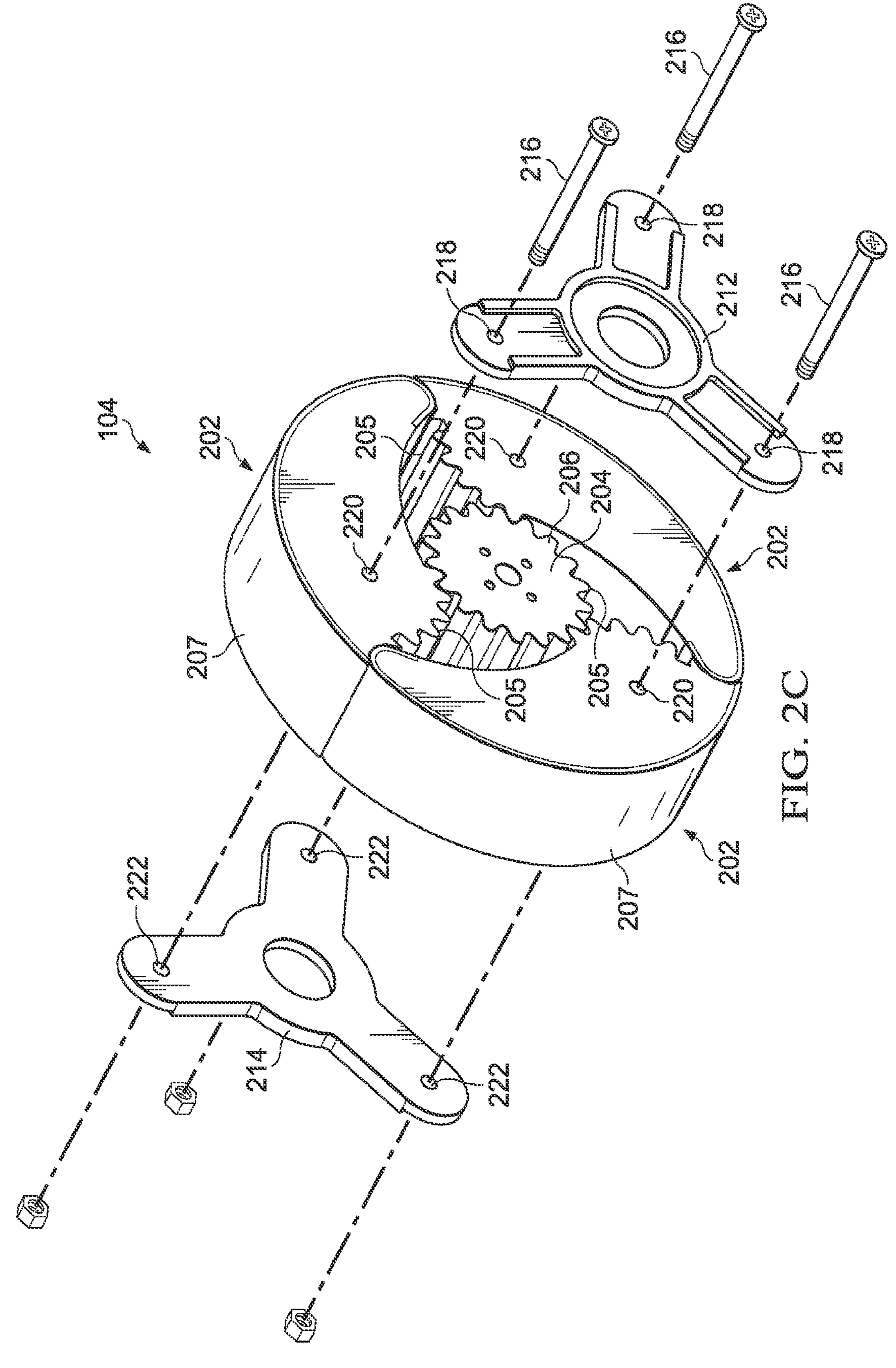
FIG. 2C is an exploded view of a wheel assembly in a closed configuration according to aspects of the disclosure.

FIG. 2A is a perspective view of a wheel assembly 104 in a close configuration and FIG. 2B is a perspective view of wheel assembly 104 in an open configuration. FIG. 2C is an exploded view of wheel assembly 104 in a closed configuration. Wheel assembly 104 includes a plurality of legs 202. Each leg of the plurality of legs 202 is hingedly coupled to a central hub 204 and includes a partial gear 205. A central gear 206 is disposed centrally between the plurality of legs 202 such partial gear 205 of each leg of the plurality of legs 202 engages central gear 206. Central gear 206 is operatively coupled to motor 106.

Each leg of the plurality of legs 202 includes an arcuate outer surface 207. When the wheel assembly 104 moves from the open position to the closed position, legs 202 pivot about central hub 204 such that a distal end 208 of each leg 202 aligns with a proximal end 210 of an adjacent leg 202. When closed, arcuate outer surfaces 207 align to form a round, wheel-like surface (e.g., FIG. 2A).

Central hub 204 includes a first spoke frame 212 and a second spoke frame 214. A fastener 216 passes through an aperture 218 in the first spoke frame 214, through an aperture 220 formed in leg 202, and through a corresponding aperture 222 formed in second spoke frame 214. In various embodiments, bearings may be utilized to reduce friction between leg 202 and fastener 216.

Figure 2D:
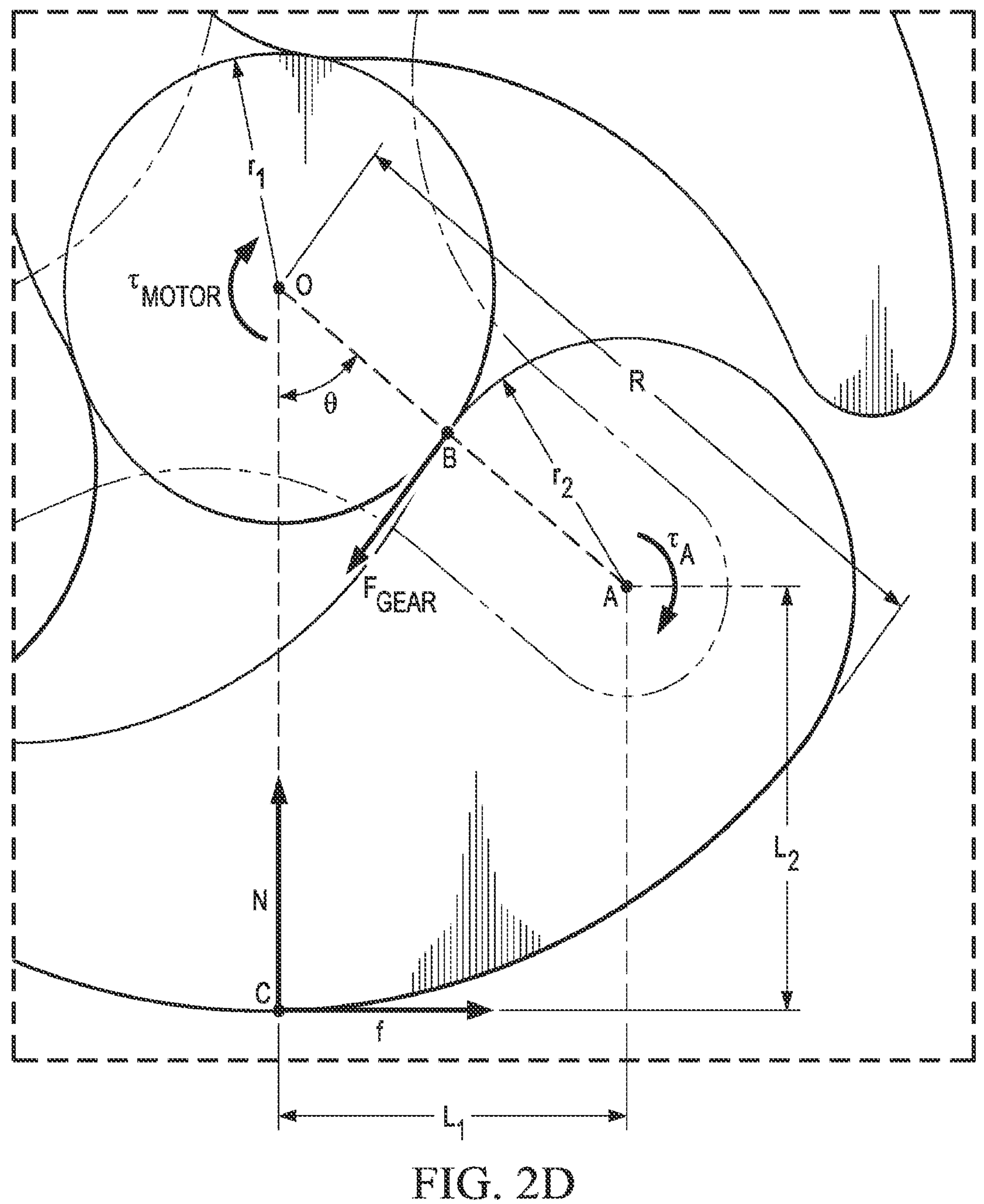
FIG. 2D is a free body diagram of a wheel in the closed position and driven in the clockwise direction according to aspects of the disclosure.

FIG. 2D is a free body diagram of the wheel assembly in the closed position and driven in the clockwise direction. During operation, wheel assemblies 104 are initially in the closed position. The closed position is suitable for moving over smooth terrain. When friction on arcuate outer surface 207 increases such as, for example, when robot 100 encounters an obstacle or uneven terrain, the interaction of central gear 206 and legs 202 causes legs 202 to rotate about central hub 204 to the open position. In this sense, wheel assembly 104 passively moves between the closed position and the open position based on the terrain conditions and friction between the surface and wheel assembly 104. In various embodiments, the amount of resistance or friction required to move leg 202 to the open position may be adjusted by changing the gear ratio between central gear 206 and leg 202. For example, a lower gear ratio between central gear 206 and leg 202 would require less torque to cause leg 202 to move to the open position.

In various embodiments, wheel assembly 104 may include a locking mechanism to secure legs 202 in either the open position or the closed position until it desirable to change the position of legs 202. For example, in various embodiments, a magnetic or mechanical lock could be utilized to secure legs 202 in either the open position or the closed position. When it is desired to change the position of legs 202, the locking mechanism may be released by, for example, de-energizing a magnetic lock, thereby allowing legs 202 to move between the open position and the closed position. In various embodiments, wheel assembly 104 may include one or more motors coupled with legs 202 to control opening and closing of legs 202 (i.e., active actuation).

In a small-size, light-weight robot, the impact force directly applied to the motor shaft is not significant. However, when used for a larger and heavier one, the motor shaft would continuously experience increased shocks and unwanted vibrations while operating in the legged mode. This would not only increase wear on the structure but also affect the sensor readings and thus cause control difficulties. Reducing shocks and vibrations would not only help the structural robustness and durability, but also enhance overall locomotion performance. Modularity is another important design consideration as it allows easy onsite replacement of the wheels which is often expected in field operations.

Figure 9A:
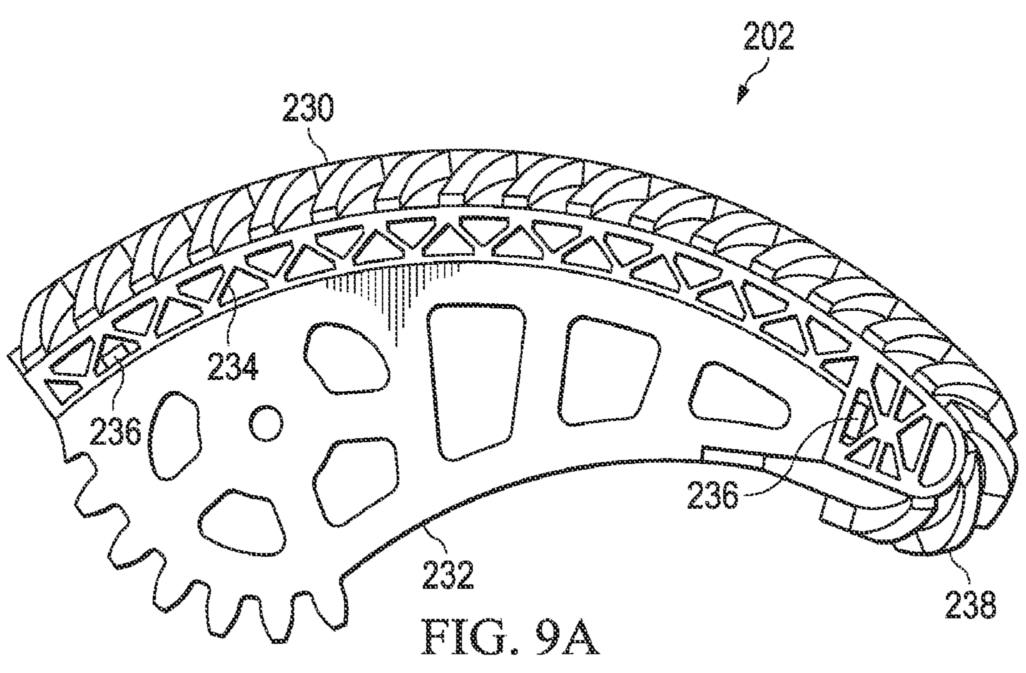
FIGS. 9A-9C illustrate designs for legs that may be used with a robot according to aspects of the disclosure.
Figure 9B:
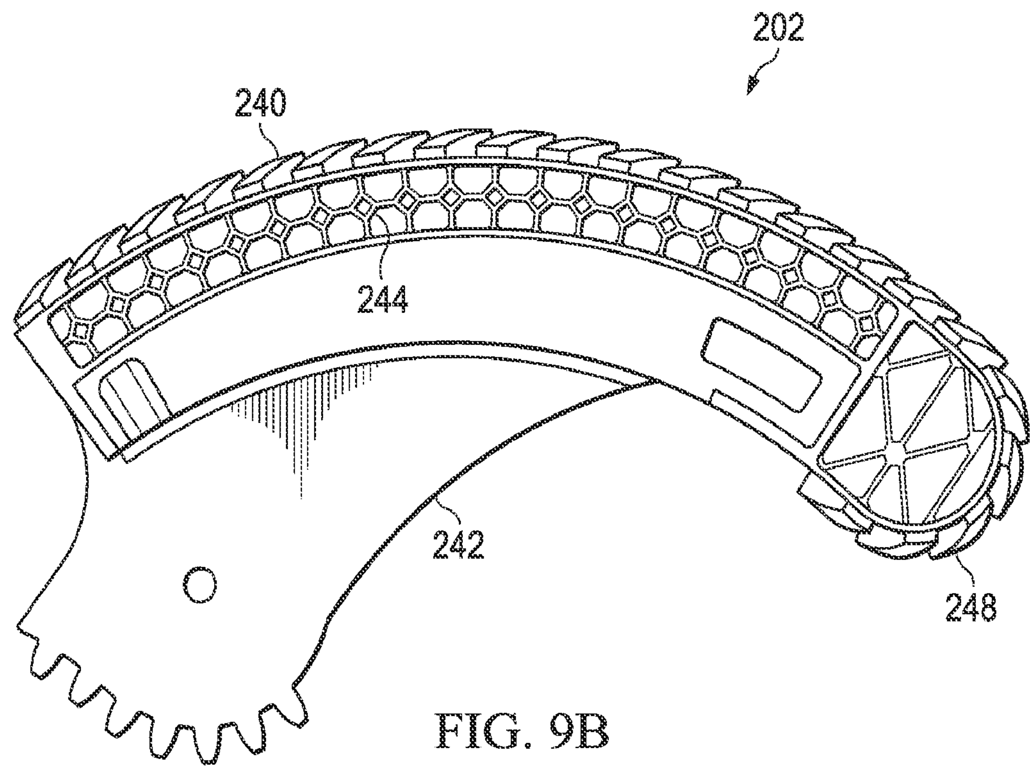
Figure 9C:
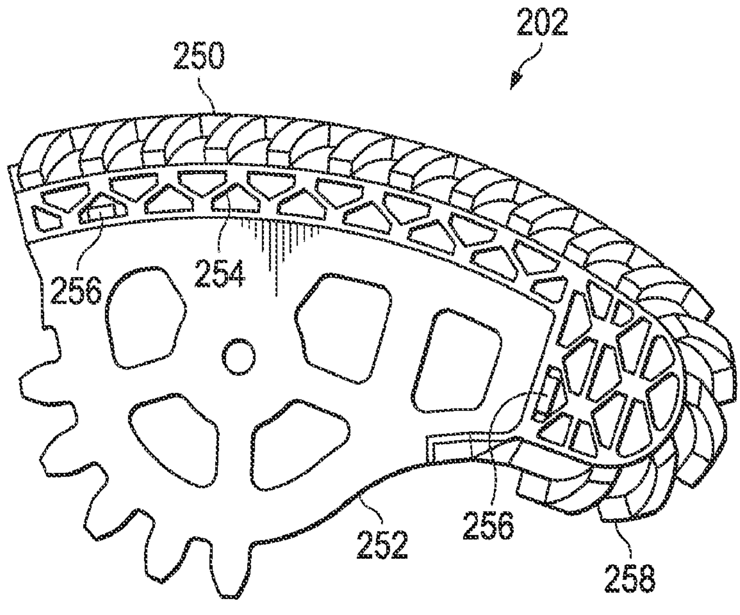

FIGS. 9A-9C illustrate designs for legs 202 that may be used with robot 100 according to aspects of the disclosure. Leg 202 of FIG. 9A is a tubeless-tire design that includes a tread 230 that is suspended from frame 232 via a webbing 234. Tread 230 and webbing 234 are made of, for example, rubbers or other materials that offer good traction and flexibility. Webbing 234 allows tread 230 to flex to soften impacts while robot 100 moves about. In some aspects, tread 230 is attached to frame 232 via tabs 236 (e.g., tread 230 includes an aperture that is stretched over the tab to secure tread 230 to frame 232). Tread 230 may be further secured to frame 232 via an adhesive. Leg 202 includes a toe 238 that is given some structure via webbing 234. Toe 238 can also provide some cushion/flex to soften impacts upon the ground etc. as robot 100 moves about, especially when leg 202 is in the open configuration.

FIG. 9B is another tubeless-tire design that includes a tread 240 that is suspended from frame 242 by a webbing 244. Tread 240 and webbing 244 are made of, for example, rubbers or other materials that offer good traction and flexibility. Webbing 244 allows tread 240 to flex to soften impacts while robot 100 moves about. In some aspects, tread 240 is attached to frame 232 via an adhesive. Leg 202 includes a toe 248 that is given some structure via webbing 244. Toe 248 can also provide some cushion/flex to soften impacts upon the ground etc. as robot 100 moves about, especially when leg 202 is in the open configuration.

FIG. 9C is another tubeless-tire design that includes a tread 250 that is suspended from frame 252 via a webbing 254. Leg 202 of FIG. 9C is similar to leg 202 of FIG. 9A, with similar parts given similar part numbers. Leg 202 of FIG. 9C differs from leg 202 of FIG. 9A in dimension. For example, Leg 202 of FIG. 9C is dimensioned for use as part of a six-leg design, whereas leg 202 of FIGS. 9A and 9B are dimensioned for use as part of a four leg design.

It will be appreciated by those having skill in the art that the dimensions of legs 202 of FIGS. 9A-9C could be modified as necessary to accommodate a design with any number of legs. It will also be appreciated that webbings 234, 244, 254 could be replaced with tubed-tire designs (e.g., inflatable bladders).

Figure 3A:
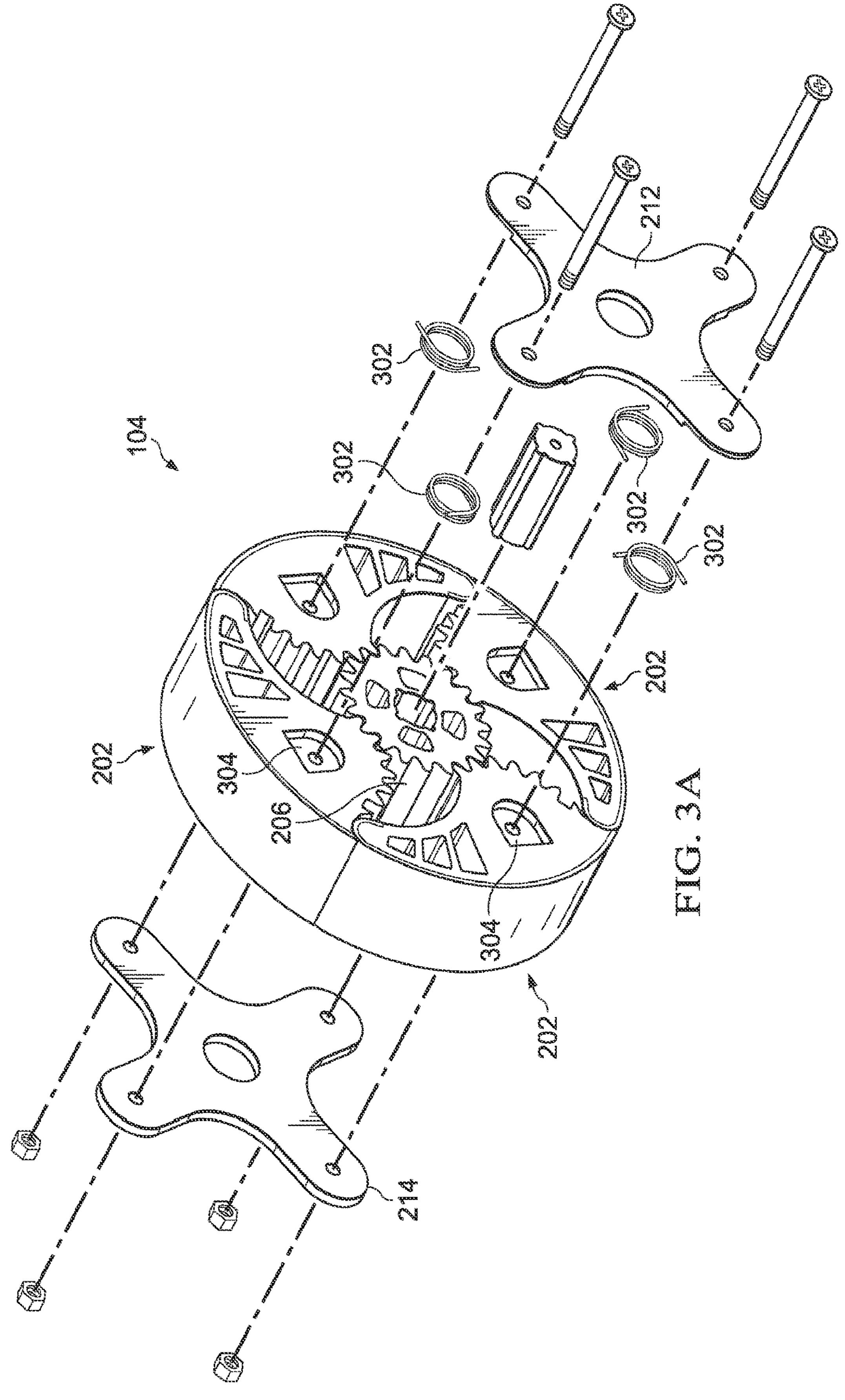
FIG. 3A is an exploded view of a wheel in the closed position illustrating a torsion spring suspension according to aspects of the disclosure.
Figure 3B:
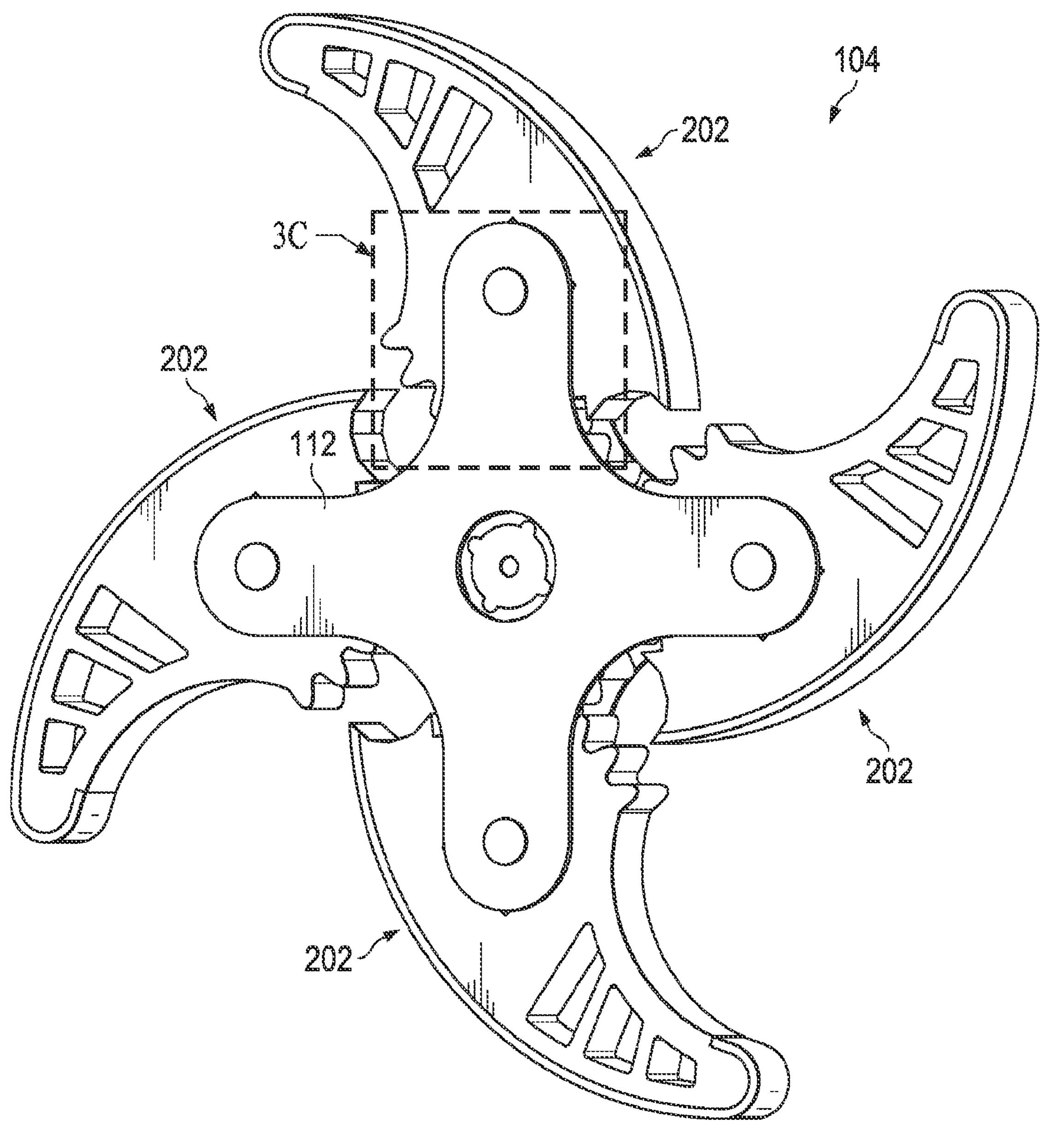
FIG. 3B is a plan view of the wheel in the open position according to aspects of the disclosure.
Figure 3C:
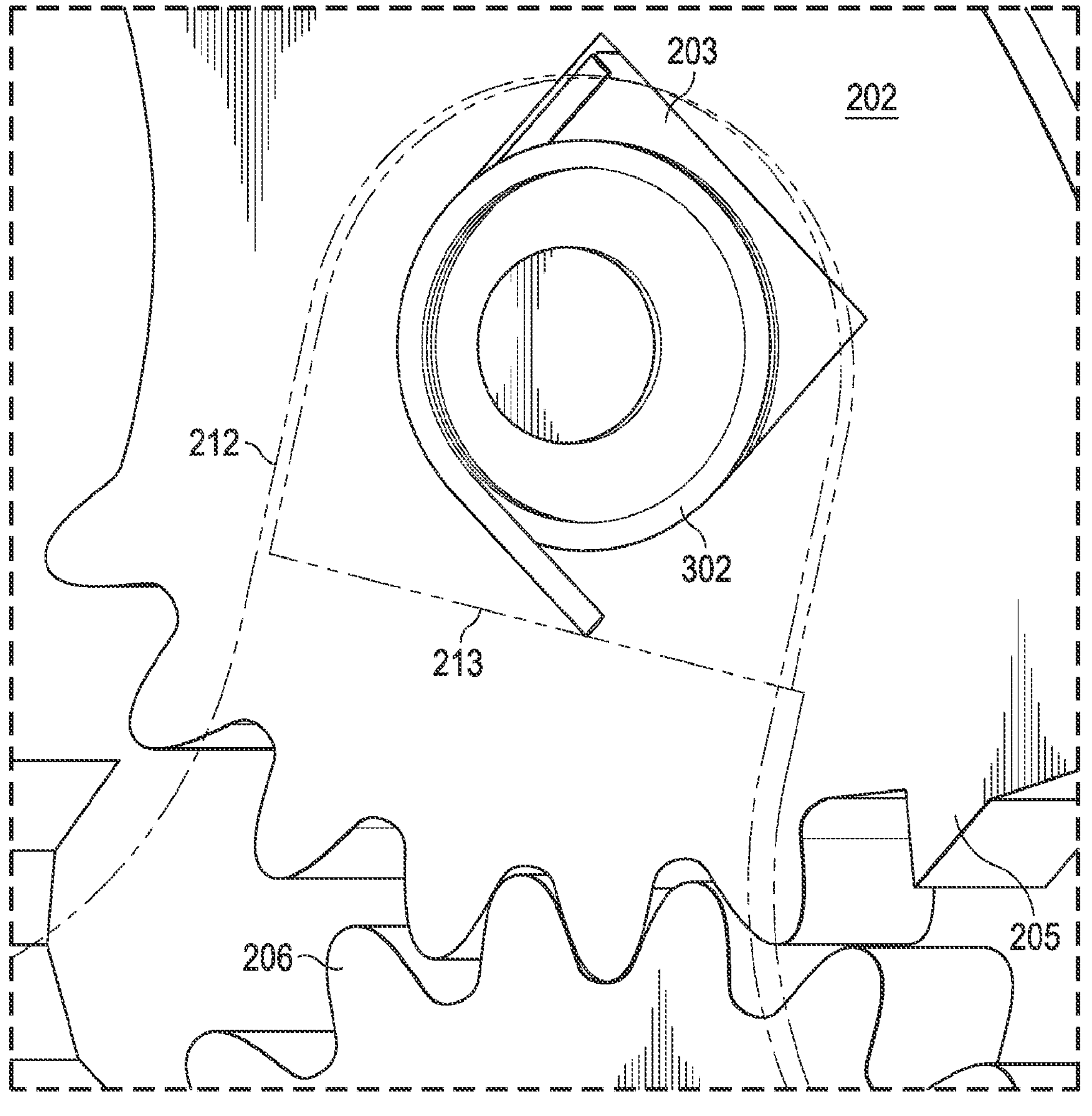
FIG. 3C is a detail view of the torsion spring suspension according to aspects of the disclosure.

FIG. 3A is an exploded view of wheel assembly 104 in the closed position illustrating a spring suspension. FIG. 3B is a plane view of wheel assembly 104 in the open position. FIG. 3C is a detailed view of torsional spring 302. Referring to FIGS. 3A-3C collectively, torsion springs 302 sit in cavities 304 and are bear against legs 202 and first spoke frame 212 (FIG. 3C). For example, torsion springs 302 bear against an edge 203 of leg 202 and an edge 213 of first spoke frame 212 to bias each leg 202 into the closed position. In some embodiments, each leg 202 includes two torsional springs 302, with the second torsional spring 302 being similarly disposed on an opposite side of leg 202. When wheel assembly 104 moves to the open position, torsion spring 302 provides resistance to movement of the leg 202. In various embodiments, torsion spring 302 could be replaced with a different type of spring, such as a linear spring, a leaf spring, a compressible media (e.g., foam, rubber, etc.), and the like.

Figures 4A, 4B:
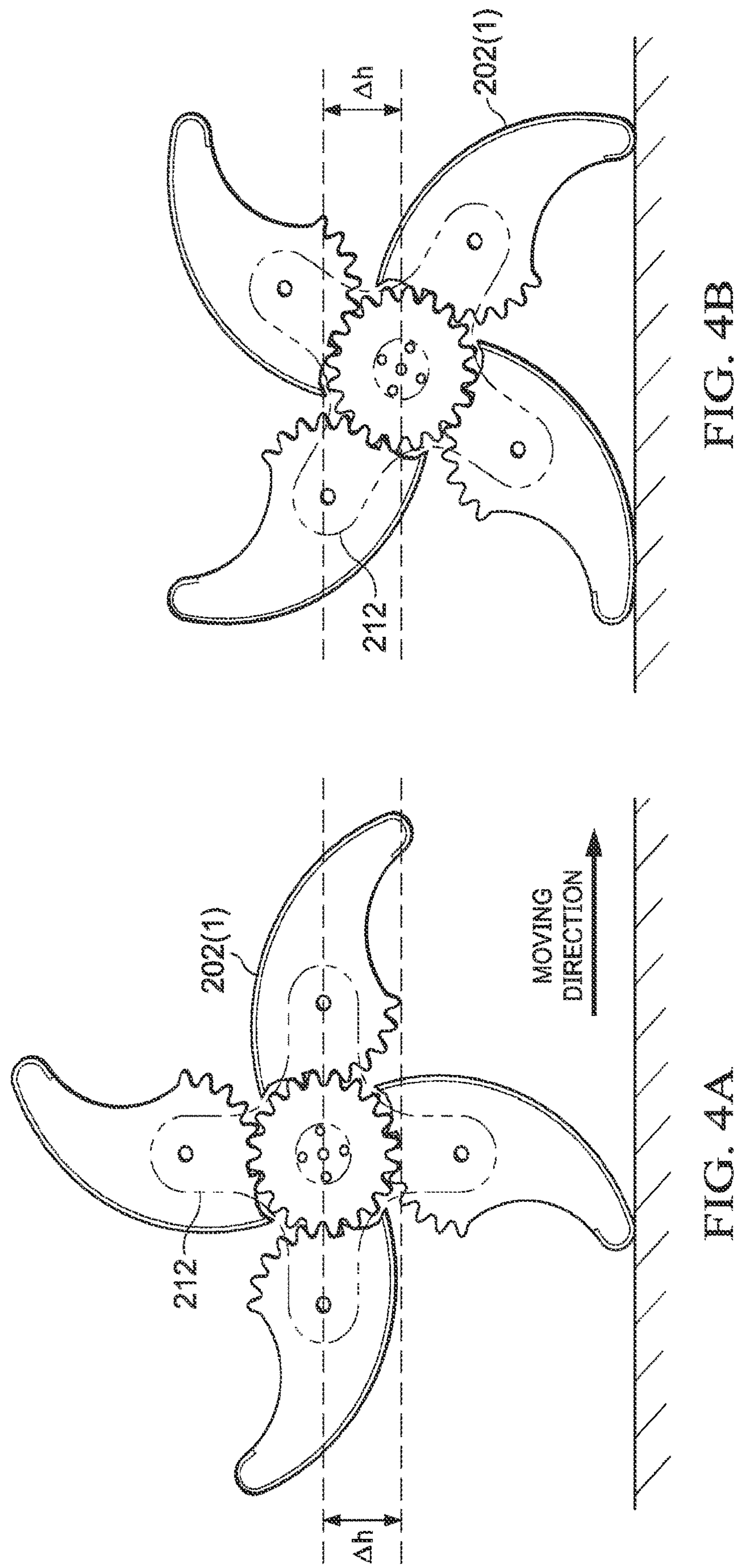
FIGS. 4A and 4B illustrate actuation of spring suspension according to aspects of the disclosure.
Figure 4C:
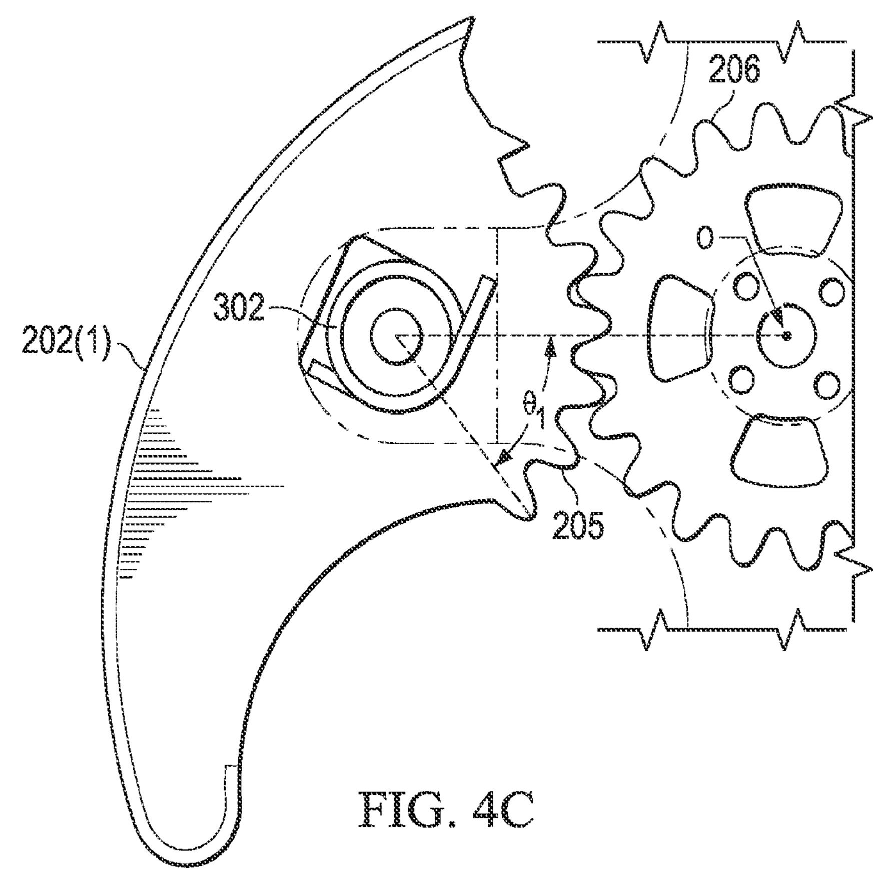
FIGS. 4C and 4D illustrate movement of a single leg according to aspects of the disclosure.
Figure 4D:
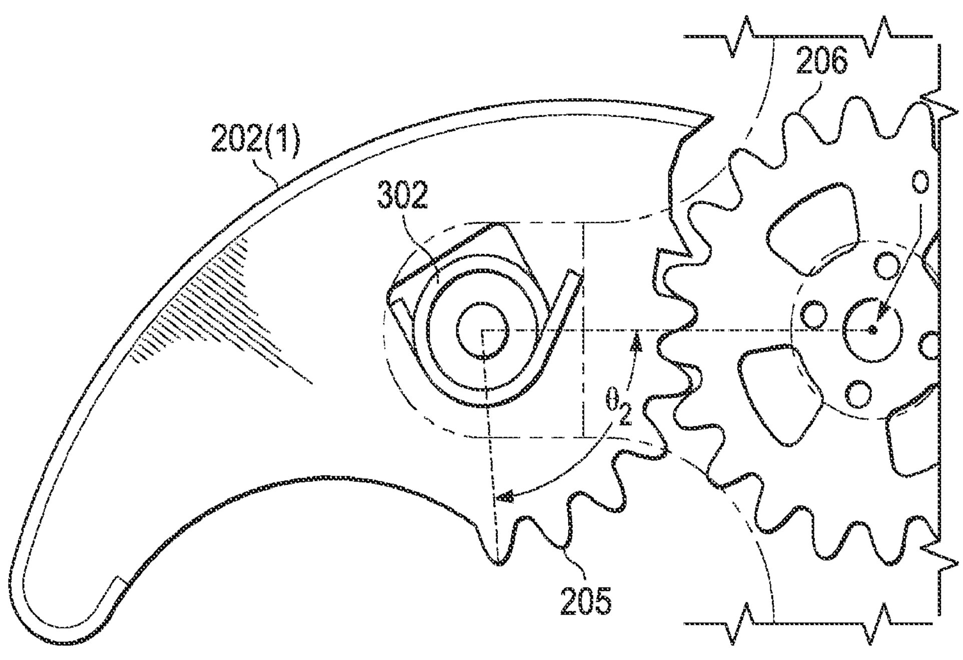

FIGS. 4A and 4B illustrate relative movement of leg 202 when an impact is experienced. In FIG. 4B, leg 202(1) is has flexed relative to its position in FIG. 4A as a result of leg 202(1) impacting the ground. FIGS. 4C and 4D are close-up views of the flex of leg 202(1), with FIG. 4C illustrating a relative position of leg 202(1) with an initial angle $\theta_1$ and FIG. 4D illustrating a flexed position of leg 202(1) having an increased angle of $\theta_2$. The amount of flex ($A_0=\theta_2-\theta_1$) of leg 202(1) is dependent upon the force encountered. Thus, torsion springs 302 cushion impact and reduce vibration/shock resulting from movement of robot 100 when wheel assemblies 104 are in the open position. In various embodiments, a single torsion spring 302 may be coupled to the plurality of legs 202. As one leg hits an obstacle or ground while walking, the free ends of the springs hit the spoke frame, winding the spring and absorbing the impact. This design is fully integrated, making the wheel structure highly modular while maintaining its mechanical simplicity.

Selection of torsional springs requires careful consideration of the physical space as well as the expected torque acting on each spring while walking. The total potential energy change due to the vertical height change while walking ($\Delta h$) can be used as the target amount of the energy to be absorbed by the springs (FIGS. 4A and 4B). This leads to an approximation of $M_r g\Delta h \approx 4n_{leg}(1/2)k\Delta\theta 2$, where $M_r$ is the total mass of the robot, g is gravitational acceleration, $\Delta h$ is the maximum change in the vertical height of the robot body while walking, k is the spring constant, and $\Delta\theta$ is the range of winding angle of the torsional spring (FIGS. 4C and 4D). The right side of the formula is multiplied by 4 because robot 100 is equipped with four wheels. For a robot with a different number of wheels, that number is multiplied to the formula. The design of the spring housing in the leg segment can be modified to adjust $\Delta\theta$. Considering practical and space limitations, its range is kept at $45\leq\Delta\theta\leq 50°$ in this specific embodiment, but the range can be adjusted.

The stiffness and the winding angle can then be used to determine the strain energy stored in each spring due to the bending moment. A spring grade is then determined depending on the incident stress. In this step, the mean diameter and the wire diameter are first selected based on the physical space constraints. Subsequently, the yield strength of the spring and the spring index are obtained. The Wahl factor is used to calculate the bending stress on the spring. If the obtained bending stress is less than the ultimate tensile strength of the spring, the design parameters are considered to be safe. Otherwise, if higher values for the mean and wire diameter are chosen, the process continues until the design is safe. This process must also ensure that the natural frequency of the spring would not result in resonance. The total weight and mechanical design and size of the wheels must be determined first in order to select proper springs.

Figure 5:
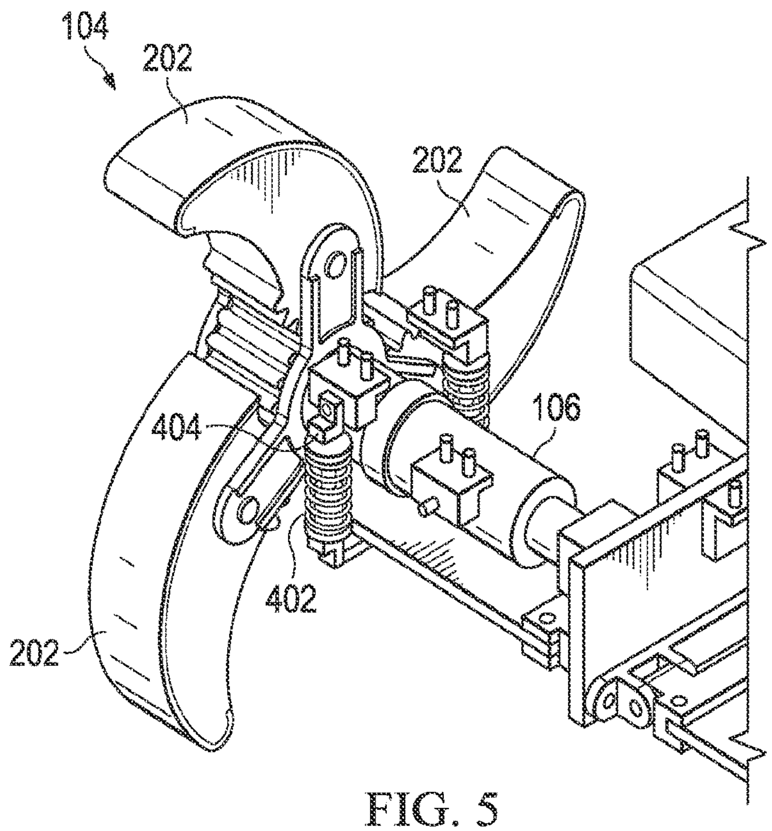
FIG. 5 is a perspective view of a spring-and-damper suspension system according to aspects of the disclosure.

FIG. 5 is a perspective view of a spring-and-damper suspension system for robot 100 according to aspects of the disclosure. In various embodiments, motor 106 may be coupled to body 102 by a spring and damper suspension. A spring 402 and damper 406 are coupled between body 102 and motor 106. Spring 402 and damper 406 facilitate reduced vibration and shock when the robot is transporting heavier payloads or traversing rough terrain, regardless of wheel assembly 104 being in the open or closed position. Combining torsional springs 302 with spring 402 and damper 406 provides an overall improvement in vibration/shock reduction.

Figure 6A:
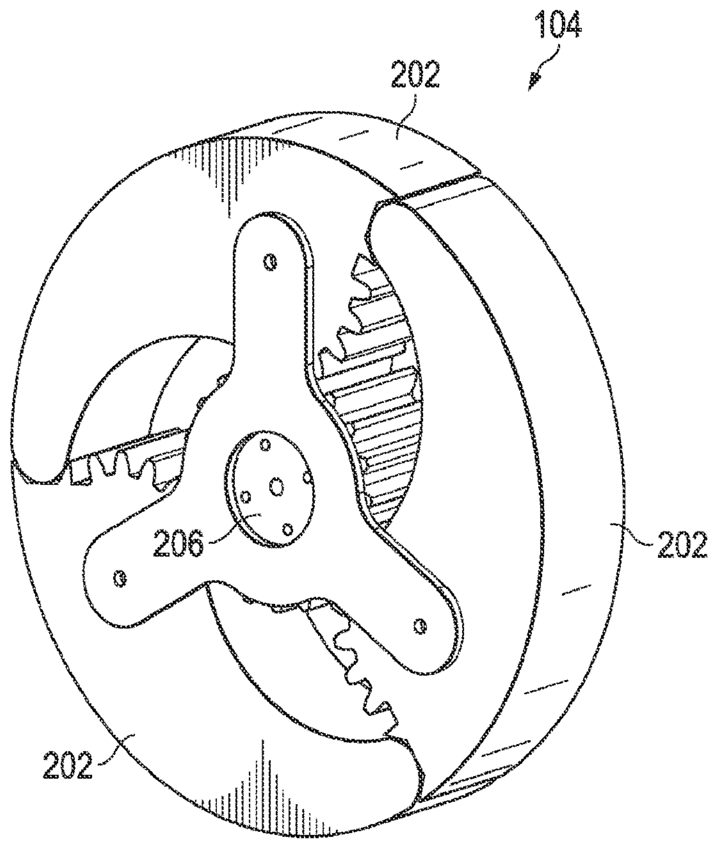
Figure 6B:
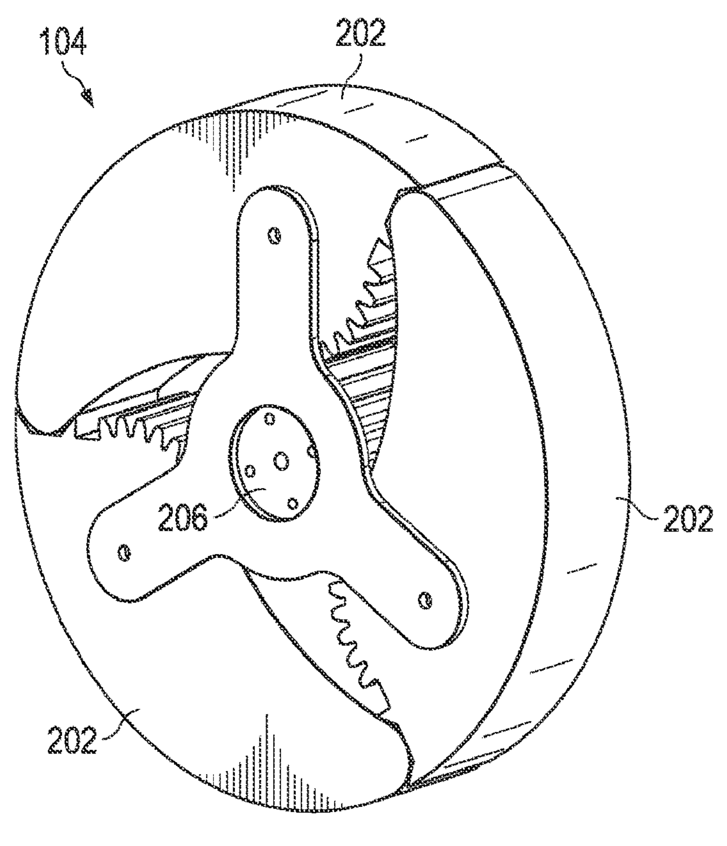
Figure 6C:
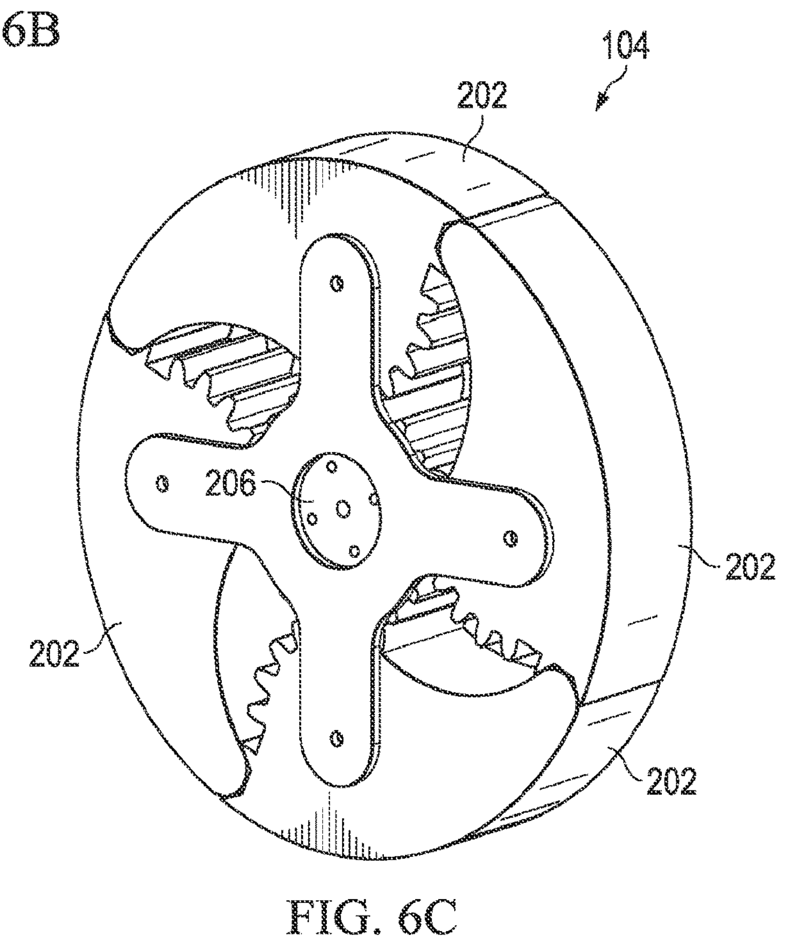
Figure 6D:
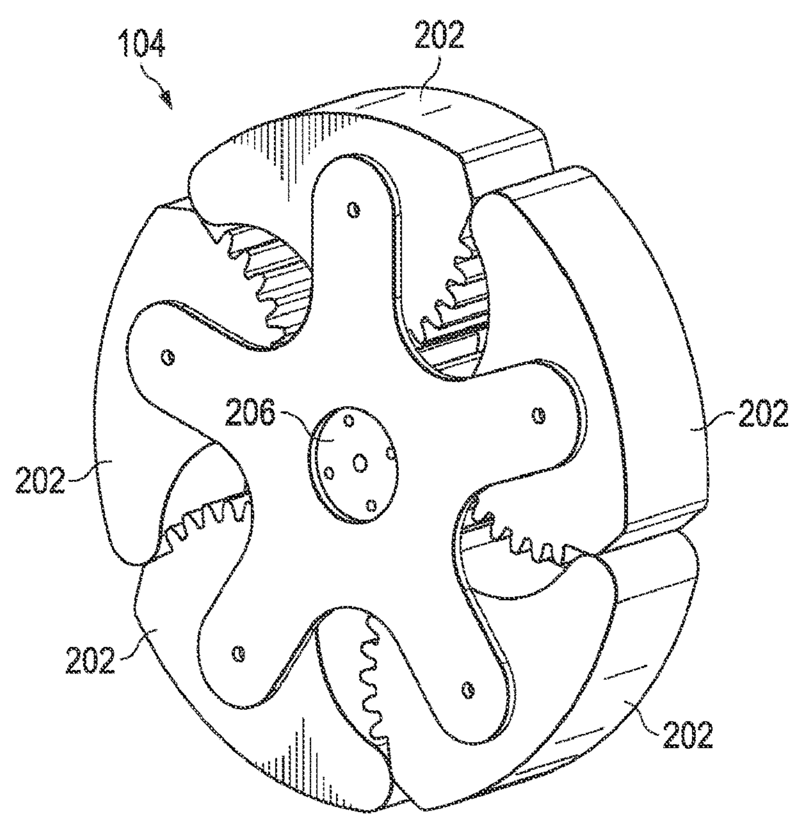
Figure 6E:
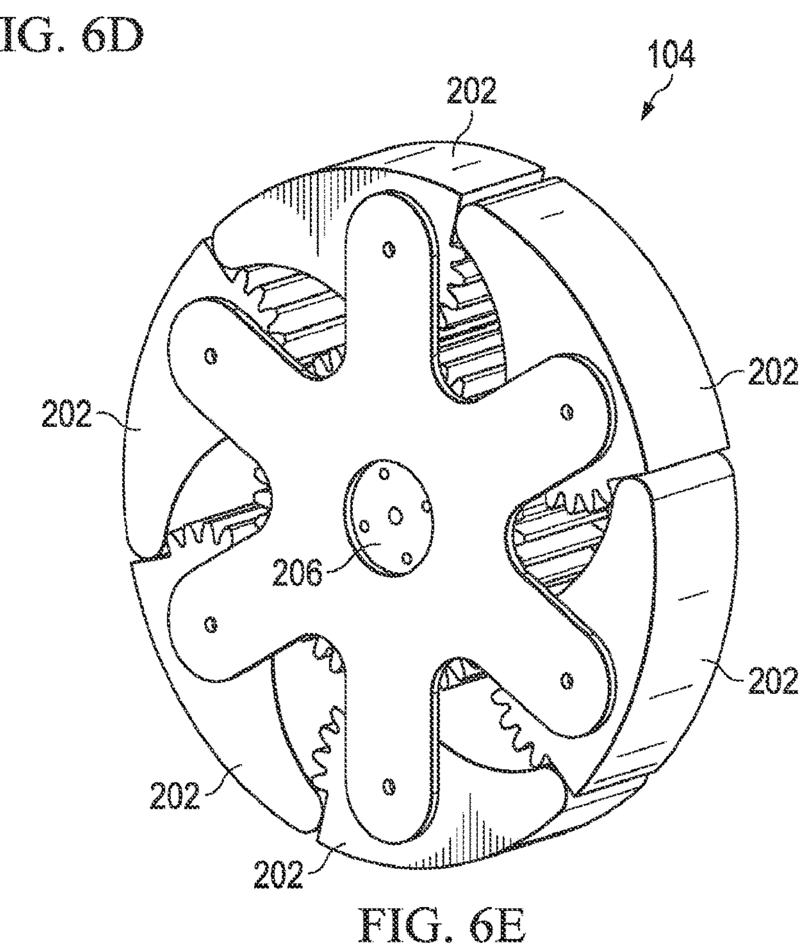

FIGS. 6A-6E illustrate embodiments of wheel assembly 104 according to aspects of the disclosure. Referring to FIGS. 6A-6E collectively, wheel assembly 104 may, in various embodiments, include two legs 202, three legs 202, four legs 202, five legs 202, or six legs 202. Additionally, as illustrated in FIGS. 6A and 6B by the number of teeth, the gear ratio between the legs 202 and the central gear 206 may be varied.

Figure 7:
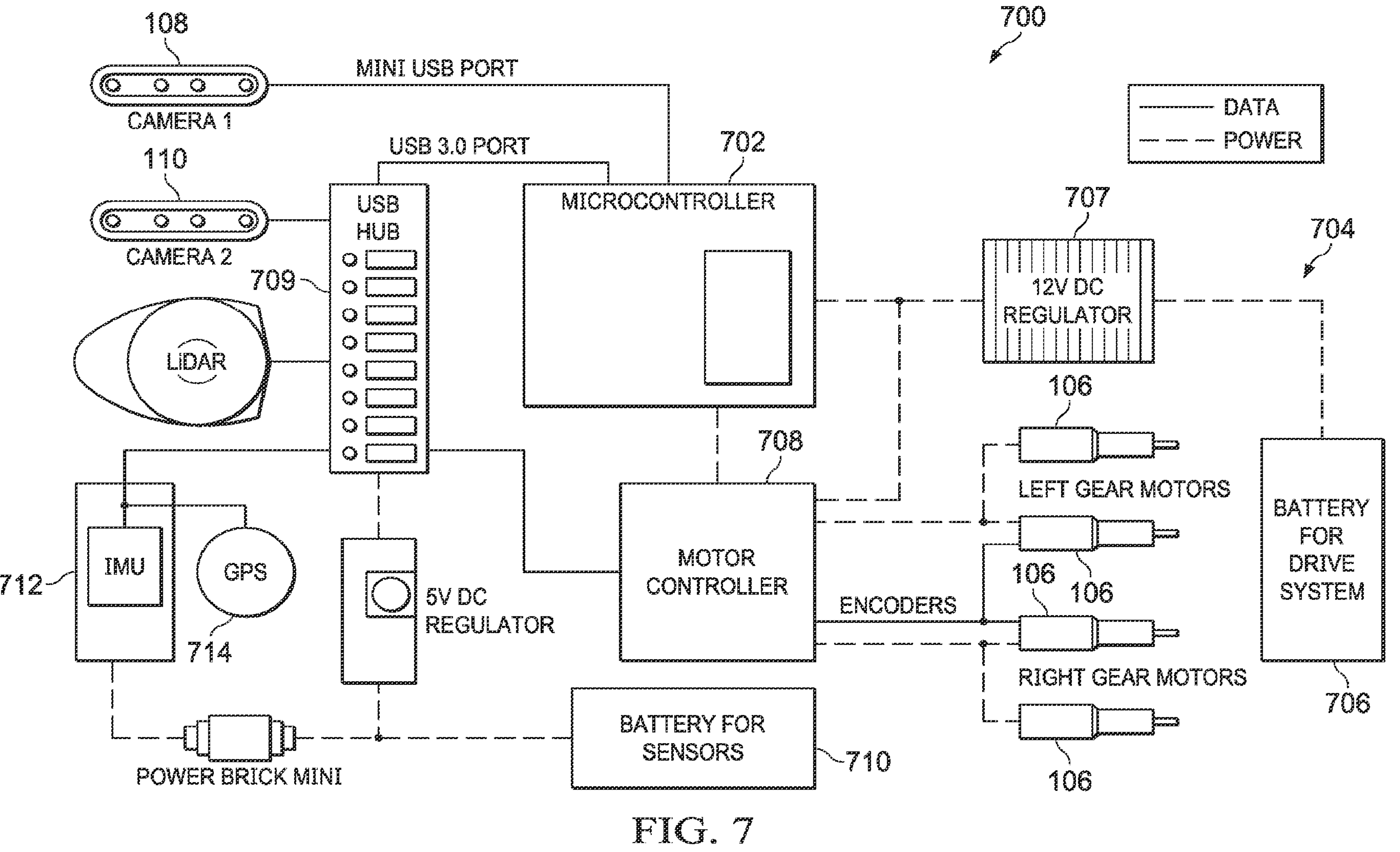
FIG. 7 is a schematic diagram of an autonomous guidance system according to aspects of the disclosure.

FIG. 7 is a schematic diagram of an autonomous guidance system 700 for robot 100 according to aspects of the disclosure. The autonomous guidance system 700 includes a microcontroller 702 that is coupled to a power source 704. In various embodiments, the power source 704 includes a battery 706 that is coupled to a current regulator 707 such as, for example a 12 Volt DC regulator. The microcontroller 702 is coupled to a motor controller 708, which is electrically coupled to motors 106. In the embodiment of FIG. 7, four motors 106 are shown, but more or fewer motors 106 may be used. Motor controller 708 regulates operation of motors 106. Front camera 108, rear camera 110, LiDAR device 112, and GPS receiver 114 are electrically coupled to microcontroller 702. In various embodiments, a universal serial bus (USB) hub 709 may be utilized to provide power and data connection to front camera 108, rear camera 110, LiDAR device 112, and GPS receiver 114. In various embodiments, USB hub 709 receives power from a second battery 710. GPS receiver 114 is coupled to an inertial measurement unit 712. The inertial measurement unit 712 is coupled to microcontroller 702 and measures and reports parameters, such as, specific force, angular rate, and/or orientation of robot 100 using a combination of accelerometers, gyroscopes, and/or magnetometers to aid in the maneuvering of robot 100.

Figure 8A:
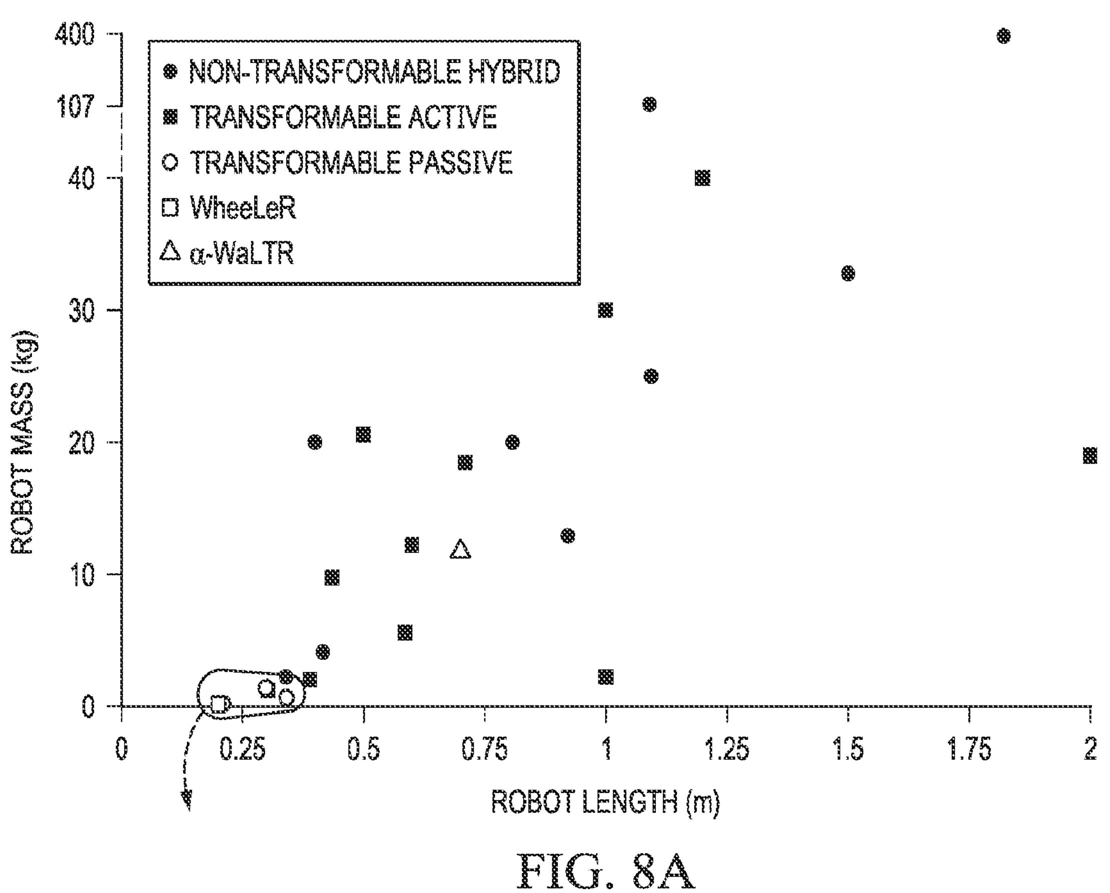
FIGS. 8A and 8B are graphs showing comparisons with existing hybrid mechanisms, with FIG. 8A illustrating weight versus size and FIG. 8B illustrating compatibility score versus complexity of transformable wheel-leg mechanisms.

FIG. 8A compares hybrid locomotion systems with the instant system in terms of the weight and the size represented by the longest body length. While non-transformable hybrids as well as actively transformable robots have been developed in varying sizes and weights, passively transformable ones have remained relatively small and light. Passive mechanisms often rely on high surface friction and/or a high rotating speed for triggering wheel-to-leg transformation. Such transformation strategies may be suitable only for small, light-weight robots. In the wheel assemblies of the instant design, the leg segments are mechanically connected to the driving system through a gear, and therefore the driving actuator together with the friction triggers the transformation even under a low speed and high payload.

Figure 8B:
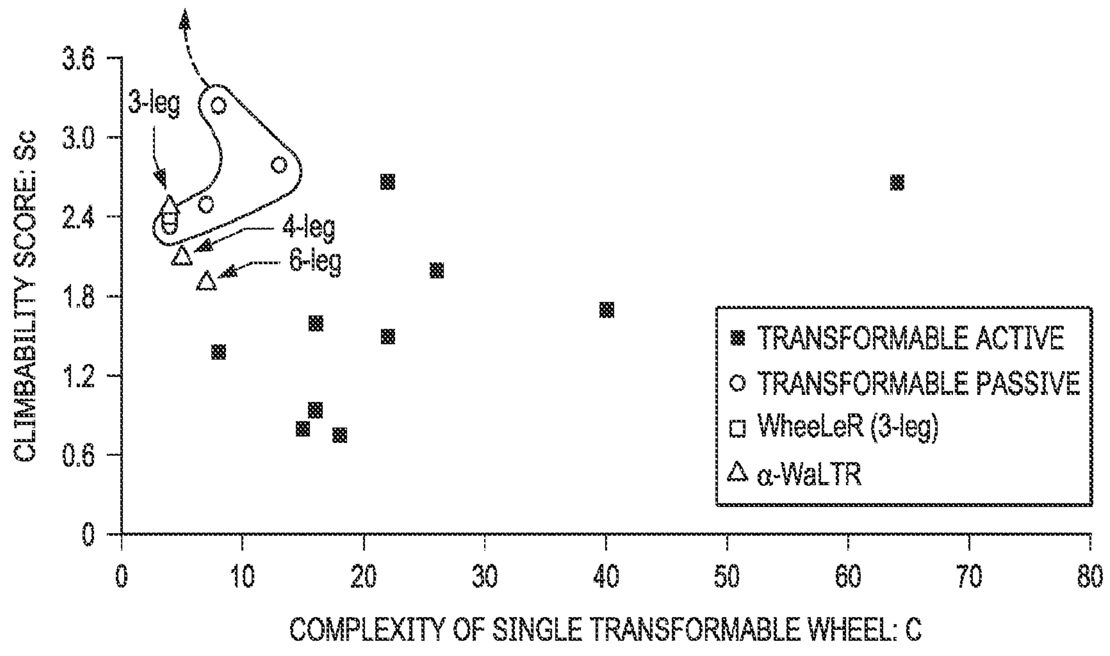

For the wheel-leg transformable mechanisms which are closely related to the presented work, we further evaluated the robot's overall obstacle climbing ability versus structural complexity. As a measure of the obstacle climbing ability, we define climability score as:

$$S_c = O_{max} / R \quad \text{Eq. 1}$$

where $O_{max}$ is the maximum climbable obstacle height and R is the closed wheel radius. Mechanical complexity is defined as:

$$C = N_A \cdot N_J \quad \text{Eq. 2}$$

where $N_A$ is the number of actuators and $N_J$ is the number of joints. As a robot may have a different number of wheels, C calculated for a single wheel is used here. A regular wheel driven by a motor has one actuator and one joint, resulting in C=1. As the design becomes mechanically more complex, C increases accordingly. FIG. 8B shows $S_c$ versus C for existing wheel-leg transformable mechanisms. While our transformable mechanism can be realized with any number of legs, the most practical choices would be $n_{leg}$=3-6.

FIG. 8B includes data for 3, 4, and 6-leg versions of the wheels for comparison. The 3-leg design achieves the lowest C with a relatively high $S_c$ compared to the 4- or 6-leg versions as well as other transformable wheel-leg mechanisms shown in the plot. In general, passive mechanisms achieve relatively high $S_c$ with a low C. Most of these existing passive mechanisms, however, have only been realized in small and light-weight platforms, occupying the lower left side of the plot in FIG. 8B. Robots equipped with the advanced wheel mechanisms disclosed herein are significantly larger and heavier than the small and light-weight platforms, while still maintaining the mechanical simplicity and the climbing ability expected in the passive systems.

Design Optimization

Designing robot 100 involves many variables and parameters to be carefully identified and examined. Selecting these design variables for desired locomotion performance can be challenging and often time-consuming. This section describes the multidisciplinary system analysis and design optimization adopted for selecting upper-level design variables, including the overall dimensions of the chassis, location of the center of gravity, and the size of the central gear of the wheels.

Design Variables and Parameters

Design variables associated with the chassis include the length (L), width (W), height (H), thickness of the chassis wall (D), the relative longitudinal position of the center of gravity measured from the front end of the chassis ($L_{cg}$), and the vertical position of the center of gravity when the robot is at the highest position (i.e., standing with the tips of the legs) ($V_{cg}$). ($r_1$) is the radius of the central gear. At this stage of optimization, the payload (P), the gear ratio between the partial gears on the legs and the central gear ($p=r_2/r_1$), the number of leg segments ($n_{leg}$), and the wheel width (w) are considered as parameters. Material densities (mc and mw) are also considered as fixed parameters. The moving direction where the wheels can transform into legs is considered forward and that side of the chassis is referred to as the front.

Locomotion Simulator

A Unity-based simulator was created for empirical evaluations of various wheel designs and sizes in terms of locomotion performance. The robot chassis dimensions can be optimized for maximizing the achievable pitch angle and minimizing the weight and thus the torque requirements given physical constraints, payload, and desired obstacle height by applying multi-objective optimization techniques. However, how the passively transformable wheels installed on this chassis would perform and behave on different terrains is hard to predict. Wheel-specific design variables, such as R, ρ, and $n_{leg}$, affect locomotion performance. Examination of these variables via physical prototyping followed by experiments is highly time consuming and costly. The presented simulator allows comparative evaluations of various wheel design options on diverse test environments.

Simulation Environment

Unity offers an easy user interface and a rich integrated development environment for robot simulations. For example, Unity-based simulators have been linked with ROS to develop and test navigation and control algorithms of unmanned aerial or ground vehicles as well as multirobot systems. The virtual locomotion test environment and robot models were created in Unity 2018.4.12f1 (Unity Technologies Inc.) on a Windows 10 computer with the following system configuration: Intel Core™ i7-8700K CPU @ 3.70 GHz; 32.0 GB DDR4 RAM @ 2666 MHz; NVIDIA GeForce GTX 1080 Ti; 256 GB M.2 PCIe NVMe SSD.

Modeling of Test Environment

Locomotion performance may vary significantly across different applications and projected environmental conditions. Most real-world applications involve a significant level of uncertainties and diverse terrain conditions and therefore the robot's versatile locomotion capability becomes critical. Benchmarking the experimental protocol presented in, a modular set of virtual environmental structures was created in Unity. While these structures are highly modular and customizable, the current test set up consists of the following: 1) Gaps with varying widths of 100, 150, 200, 250, 300; 2) Obstacles with varying heights 60, 80, . . . , 240; 3) Stairs with the tread of 250 (standard depth) and varying rise height of 160, 180, 200, and 220; and 4) Rough surfaces with irregular bumps with varying average heights of 50, 100, 150, and 200.

Modeling of Robot

Creating a Unity model of robot 100 involves the following four steps: 1) importing 3D CAD models of the wheel components to Unity; 2) creating colliders for individual moving components of the wheel; 3) assembling all wheel components; and 4) connecting four wheels to a robot chassis model. First, 3D models of the transformable wheels were created in SolidWorks and imported to Unity. Second, colliders are defined for individual moving components, including the central gear and leg segments. For the wheel assembly, all joints connecting the gears and legs to the spoke frame were defined as configurable joints, which provides customizability and guarantees the accuracy of the shaft positions. Lastly, four wheels are assembled to the chassis. The joints connecting the central gears to the chassis are defined as hinge joints. A hinge joint allows integrating a motor with target speed and torque settings. The chassis dimensions followed the suggested values in Set 4.

The gear ratio ρ affects the wheel-to-leg transformation tendency, i.e., the larger the value of ρ, the easier transformation from wheel to legs. $n_{leg}$ also influences the locomotion behavior, such that the wheel with a higher $n_{leg}$ would result in smoother walking, while $S_c$ (1) becomes smaller than that with a smaller $n_{leg}$. For empirical evaluations of locomotion performance, five wheel designs were created as shown in FIGS. 6A-6E: [I] $n_{leg}$=3 with ρ=1, [II] $n_{leg}$=3 with ρ=2, [III] $n_{leg}$=4 with ρ=1, [IV] $n_{leg}$=5 with ρ=1, and [V] $n_{leg}$=6 with ρ=0.5. For each design option, varying wheel sizes of R=80-110 with 5 mm increment were considered, resulting in 35 sets of wheels for simulations. While previously suggested at least R=95 to satisfy the minimum traversable gap, we opted to explore varying wheel sizes in simulations for comprehensive understanding of the dynamic behavior and relationships between the wheel design, size, and locomotion performance.

Simulation Protocols and Results

The chassis model based on Set 4 equipped with four transformable wheels in one of the 35 design options was tested on four types of environments (i.e., stair, gap, obstacle, and rough terrain). Locomotion testing was performed for 1) forward motion (wheel-leg transformation expected), 2) backward motion (wheels remain closed), and 3) turning on a spot. Backward motion is similar to that of conventional wheeled robots and thus provides good comparison between the two locomotion methods under the same hardware conditions. For the forward and backward locomotion tests, the robot was given a command to move on each surface three times and the number of successes was recorded. If the robot traverses a given terrain within a certain amount of time (i.e., 60 seconds for staircases and rough surfaces; 10 seconds for obstacles and gaps) at a motor speed of 3.5 radians per second, it is considered a successful traversal. The robot's turning performance was tested by rotating in the clockwise direction on asphalt, concrete, tiles, and rough surfaces (20 & 50). Asphalt, concrete, and tiled surfaces were created with different dynamic friction factors (0.68, 0.80, 0.40) and static friction factors (0.68, 1.00, 0.40) on a flat surface. Since robot 100 is capable of turning on the spot, experiments for turning with a radius is omitted. In addition, instead of defining the success criteria and counting the successful trials as done for forward and backward locomotion testing, the following scoring method is adopted for measuring turning performance:

$$S_t = T_t^{min}/t = T_t,$$

where $T_t$ is the time it takes for a full 360° turn and $$T_t^{min}$$

is the minimum turning time given the angular velocity of the wheels $\omega^{max}$ assuming the wheels move on a complete circular path, calculated by $$T_{tw}^{min} = W\pi R\omega^{max}.$$

Testing showed that when the robot moves in the wheeled mode, it shows highly limited locomotion capabilities in all challenging terrains except for the gaps smaller than the closed wheel diameter and rough surfaces with h=50. Wheel-to-leg transformation not only makes it possible for the robot to overcome obstacles and climb stairs, but also largely increases the versatility on gaps and rough surfaces. When comparing the forward locomotion results within each row, the total green area tends to decrease as the number of legs increases. The overall results indicate a trend of a better overall locomotion ability with a smaller number of legs and a larger wheel size.

Specifically, $S_c$ decreased as $n_{leg}$ increases (i.e., $S_c$=2.5 in Design I, 2.1 in Design III, and 1.92 in Design V with R=95). One exception is observed in Design I on stairs, where the green area expands and then decreases as the wheel radius increases. Unlike single obstacles, stairs require the robot to continuously move along a slope. A larger wheel size and a smaller number of legs cause the robot to topple occasionally. We also analyzed the vertical trajectories of the robot's center of gravity while walking on a flat surface. The simulations involved the five designs with R=95. Standard deviations of the vertical trajectories were 149 for Design I, 133 for Design II, 44 for Design III, 38 for Design IV, and 31 for Design V. A smaller $n_{leg}$ causes higher fluctuations in the vertical motions, directly linked to the physical vibrations and shocks experienced by the robot while walking. The standard deviation significantly reduces when $n_{leg}$≥4 (Design III-V) compared to $n_{leg}$=3 (Design I & II).

Based on these results, Design III with R=95 or larger satisfies our locomotion objectives. This also aligns with the results from the multi-objective optimization. For this selected design, turning performance was also tested for two sizes of R=95 and R=110. The results showed that $S_t$=0.65 with R=95 and 0.64 with R=110 on concrete, 0.63 and 0.66 on asphalt, 0.49 and 0.53 on a rough surface with h=20, and 0.45 and 0.45 on a rough surface with h=50 for the two wheels, respectively.

Hardware Development

The Set 4 variables (FIG. 9) for the chassis and Design III in two different sizes (R=95 & 110) for the wheels are used for hardware construction. For further physical evaluations of locomotion performance and validation of the Unity simulator, two additional sets of wheels, including Design I with R=80 and Design V with R=110, were also fabricated. The overall software architecture is based on ROS.

Embedded Hardware Components

FIG. 7 shows the embedded electronic components and actuators in a wiring diagram. Their technical specifications are listed below:

Actuators: 4 planetary gear motors with 188:1 gear ratio, 30 RPM, 3.3-5V encoder Sensors: 2 RGB-Depth (RGBD) cameras (Intel RealSense D-435i), IMU (Pixhawk Orange Cube; tri-axial accelerometer, gyroscope, and compass), GPS (CubePilot Here3 Precision GNSS Module)

Battery: 16,000 mAh 14.8V Lipo Battery for the drive system and 5,200 mAh 14.8V Lipo battery for the sensors and the main processing board.

Motor controller, powered USB hub, power brick mini, 5V & 12V DC regulators, RP-SMA cables, the front camera, LiDAR, and IMU are connected to a single powered USB hub which is powered by a 5,200 mAh battery and a 5V DC regulator. The IMU is powered through the power brick mini. The USB hub is connected to the USB 3.0 port where the mini USB port is used to operate the rear camera. The 16,000 mAh battery powers the drive system and Jetson TX2 through a 12V DC regulator. The motor controller is connected to the same USB hub and the motors along with the wheel encoders are connected to this motor controller. The encoders are powered through the GPIO pins of Jetson TX2. The reverse polarity SMA Cables (RP-SMA) are used as wireless network extension cables which are attached to the Jetson TX2 board. The 2.4/5 GHZ dual band RP-SMA antennas are attached on either side of the robot for enhanced WiFi connectivity.

Design, Fabrication, and Assembly

The advanced wheel assembly in Design III consists of a central gear, four leg segments, four torsional springs, and two spoke frames for the selected 4-leg configuration. The estimated stiffness of the spring k is about 0.9 Nm/rad with an estimated $M_r$=13. Following the selection process previously described and commercial availability, we selected torsional springs that can work for both wheel sizes with its wire diameter of 2.16, the outer diameter of 19 and the torque of 1.45 Nm. Individual wheel components were 3D-printed with PLA with 40% infill rate. The contact surface of each leg is covered with a friction-enhancing rubber sheet (e.g. secured to arcuate outer surface 207). The sheet is attached to the 3D-printed leg using screws and adhesive. A torsional spring is inserted in the cavity in each leg, and all legs are assembled around the central gear. Two spoke frames hold the springs in place and assemble the central gear and the legs together. The fully assembled wheels are then attached to the motor shaft through a barrel hub. This connector allows easy and quick replacement of a wheel when needed. While maintaining the overall dimensions of the chassis suggested from the optimization process, the curved chassis design (see FIG. 1) provides sufficient space for the front and the rear motor mounts and installation of the antennas while reducing the overall weight. The chassis is composed of a custom-cut carbon fiber base plate, 3D-printed PLA walls, and a laser-cut acrylic top cover. Each wall slides in a slot on its adjacent wall for secure locking between the two. The front and rear walls have windows for the RGBD cameras and the 3D-printed LiDAR and GPS mounts are installed on the top cover. The top cover is supported by two columns mounted on the base plate. Two antennas are installed on the left and right sides of the robot. Four 3D-printed twist-locks are added to secure the top cover to the chassis walls, offering easy access to the internal circuitry of the robot for debugging and modifications in assembly. Additional screws and nuts are used for fully securing the top cover before deployment.

System Architecture and ROS Packages

The overall control system is largely based on open-source ROS packages developed for localization, obstacle avoidance, path planning, and locomotion controller. Localization is based on the ROS Robot Pose Extended Kalman Filter (EKF) package that utilizes the GPS, compass, and IMU data. Obstacle detection is performed using the laser and depth image captured by the 2D LiDAR and RGB-D cameras. The Real-Time Appearance Based Mapping (RTAB-Map) package in ROS visualizes the odometry of the ground and obstacles, and RTAB-Map generates point clouds of detected obstacles from depth images captured by RGB-D cameras. Global and local cost maps are created using the depth and laser data. The move base ROS package serves as the main path planner for the robot. This package processes the current velocity and position of the robot from the localization algorithm and generates several sample paths.

Experimental Evaluation

Physical experiments focused on evaluating a) the effect of spring suspension on the advanced wheel assembly, b) versatile locomotion performance, and c) autonomous stair climbing capability.

Evaluation of the Advanced Wheel Design

To evaluate the efficacy of the advanced wheel design discussed herein, triaxial vibrations were measured while the robot rolls with wheels and walks with legs on a smooth and flat concrete surface. The IMU in Pixhawk was used to measure the vibrations. Row acceleration values were filtered using a high pass filter to create a reference set, and the standard deviation of the latest value of the accelerations is determined with respect to the reference. Two sets of Design III wheels (R=95 and 110) with and without the springs were employed for experiments. The robot was operated to move backward in the wheeled mode for 30 seconds and forward in the legged mode for 30 seconds at the speed of 0.16 rad/sec and 0.32 rad/sec. The mean acceleration was obtained for each axis and the whole-body vibration (WBV) was calculated by:

$$WBV = \sqrt{\left(a_x^2 + a_y^2 + a_z^2\right)}(ISO\ 2631\text{-}1{:}1997) \quad \text{Eq. 3}$$

where $a_x$, $a_y$ and $a_z$ are the mean accelerations along x-, y-, and z-axis, respectively. Torsional springs 302 in the advanced wheel design effectively reduced the WBV by 25% (R=95) and 33% (R=110) when operated at 0.16 rad/sec and 13% (R=95) and 18% (R=110) at 0.32 rad/sec.

Evaluation of Versatile Locomotion Performance

For physical evaluation of locomotion performance, the robot was remotely controlled to move on various terrains and climb over obstacles. Testing environments included grass, asphalt, concrete, rough terrain with overall roughness of 20 and 50, staircases (raise height/tread width: 160/420; 180/290), and single right-angled obstacles (h=160-240). On each environment, the robot was manually controlled to move at 0.32 rad/sec backward and forward three times and successful traversals were recorded. On grass, asphalt, concrete, and rough surfaces, the robot was tested for forward and backward motions as well as turning. The robot showed a 3/3 success rate on both wheeled and legged locomotion on grass, asphalt, concrete, and rough terrains up to h=50. The wheels with R=80 was unable to traverse a rough terrain with h=100 in both experiments and simulations when operated in the wheeled mode. When operated in the legged locomotion, all wheels could reliably climb over both types of staircases except for Design I showing 2/3 success rate on the 180-raise staircase. Design I (R=80), Design III (R=95), and Design V (R=110) could reliably climb over an obstacle up to $O_{max}$=200, and Design III (R=110) was able to climb up to 220. As shown previously in FIG. 3*b*, when $n_{leg}$ increases from Design I to V, $S_c$ slightly decreases while C increases: $S_c$=2.5 and C=4 for Design I, $S_c$=2.1 and C=5 for Design III, and $S_c$=1.92 and C=7 for Design V. This indicates that given R a design with a smaller $n_{leg}$ achieves better climbability due to the longer stroke expected from the legs when opened. When operating in the wheeled mode, $O_{max}$ was about the same as the radius of the wheel resulting in $S_c \neq 1$. The experimental results were highly consistent with the simulation outcomes, proving the potential of the simulator for predicting physical locomotion performance of different wheel designs.

The robot's locomotion performance on spot turning has also been tested for Design III. On grass, asphalt, concrete, and rough surfaces, both sets of Design III wheels showed similar performance measured by $S_t$, such that $S_t$=0.42/0.44 on concrete, 0.38/0.44 on asphalt, 0.32/0.36 on a rough surface with h=20, and 0.31/0.29 with h=50. Compared to the simulation results in Section IV-D, physical turning experiments resulted in $S_t$ values which were about 33% lower than that from the simulations. Due to the passive nature of the transformable wheels, turning on a spot requires two wheels on one side to move forward in the wheeled mode and the other two to move backward in the legged mode. In simulations, the motors perform ideally and continuously rotate while walking, but in reality when the legs hit the ground, the angular speed of the motors instantly decreases drastically and recovers over time. This increases $T_t$ and thus lowers $S_t$ in physical experiments. However, overall trends of $S_t$ in both simulations and experiments were consistent implying that the simulations can provide useful performance indication for different terrain conditions.

Autonomous Stair Climbing

The stair climbing function of the robot is considered to be a signature locomotion capability and serves as a proof of system-level integration of robot 100 as a fully functional robotic platform. Robot 100 equipped with the Design III (R=95) wheels was programmed to climb over a staircase. The selected environment is a U-shaped double staircase with 180 raise and 290 tread width, consisting of two sets of double-walled stairs connected with a U-shaped landing floor. For onboard, real-time autonomous navigation, a simple algorithm which utilizes LiDAR for real-time navigation on staircases was developed and implemented. The robot can be initially positioned facing either forward or backward. If it is facing backward, the robot first turns around to utilize the legged mode while climbing; otherwise, it simply proceeds to the staircase. The 2D LiDAR scans the walls and controls the drive system to align the robot in between the two walls while moving forward by autonomously adjusting its heading direction. When the robot reaches the landing floor, it determines the turning direction by examining the surrounding walls and navigates through the corners to find the next staircase. Successful traversal rate using this algorithm was over 90% out of over 20 trials.

Algorithm for Stair Climbing Via Wall Tracing

Urban environments involve unique locomotion challenges due to coexisting built and natural environments and diverse obstacles, including stairs. The ability to traverse stairs is considered a signature capability of robot 100. The presented algorithm enables autonomous stair climbing via wall tracing then there exists a wall(s) on one or both sides. It can be used for various staircases, including straight, L-shape, or U-shape staircases. Robot 100 uses the laser data to trace the position and orientation of itself relative to the wall(s). It then controls the motors to keep itself aligned with the walls maintaining a certain distance. When the robot reaches the landing floor, the robot may return to the ground floor using the same algorithm. The pseudo algorithm for this is provided in Algorithm 1.

Algorithm 1 - Stair Traversing Algorithm

```
1:  Reach the entrance of staircase and face towards the first stair
segment
2:  for Every time step do
3:      if state == 0 then
4:          if Detects double-side walls then
5:              Start tracking both walls
```

-continued

Algorithm 1 - Stair Traversing Algorithm

```
6:              state = 1
7:          else if Detects only one wall on left/right side then
8:              Start tracking this wall
9:              state = 2
10:         else
11:             state = −1
12:         end if
13:     end if
14:     while state == 1 or state == 2 do
15:         Go forward/upward, while maintaining reasonable
16:         relative orientation and position w.r.t. the two walls
17:         (Fig. 17(c)) / single wall (Fig. 17(d)) being tracked
18:         if Detects a wall in front within d=2 then
19:             Start tracking this wall, determine rotation
20:             direction towards next stair segment.
21:         else if Surpassed the walls/wall being tracked, cannot
detect wall in front within d then
22:             state = 4
23:         end if
24:     end while
25:     while state == 3 do
26:         Rotate towards next stair segment (Fig. 17(e))
27:   if The wall being tracked is parallel to the orientation of robot then
28:             state = 0 (Fig. 17(f))
29:         end if
30:     end while
31:     while state == 4 do
32:         Stair climbing accomplished.
33:     end while
34:  end for
35:  Notes:
36:  (1) d is the width of staircase.
37:  (2) State 0: Ready to start next stair segment.
38:  (3) State 1: On a stair segment with double walls.
39:  (4) State 2: On a stair segment with single wall.
40:  (5) State 3: Rotating towards next stair segment.
41:  (6) State 4: Finished stair climbing. Waiting for further
42:  commands.
```

Conclusion and Discussion

The presented multi-objective optimization analysis allows the designer to select upper-level design variables considering application-specific constraints. The design of the wheels can be further customized to achieve a higher $S_c$ by extending the length of the leg segments making each leg overlap with an adjacent leg when closed. The developed Unity-based simulator enabled comprehensive and comparative analyses among varying design options especially when 1) the searching scopes for individual variables are large and 2) conventional optimization techniques are not applicable. The simulation results were closely aligned with the experimental outcomes, showing the potential of this simulator for predicting physical locomotion performance. This is also referred to as “Sim2Real” transfer. This simulator can lead to significantly reduced developmental time and cost for such robots. The system-level integration was demonstrated by the robot autonomously climbing over a staircase using a simple wall-tracing algorithm.

The spring-suspension mechanism newly introduced to the wheel design resulted in meaningful reduction in overall vibrations. The torsional springs encased in individual leg segments kept the overall design simple and modular. This feature becomes more useful in the design with a small $n_{leg}$, where the entire body would suffer from more significant shocks while walking. With a larger $n_{leg}$, the walking behavior is much smoother and thus the original wheel assembly without the springs can be used if desired. A conventional spring-damper mechanism commonly adopted in cars and larger mobile platforms may replace this spring-only mechanism for more effective shock absorption and improved long-term durability, especially for a larger platform. However, this design would increase the overall structural complexity.

The rubber sheets attached to the wheels to increase friction may be replaced with properly designed tires for better shock absorption. Custom tires for individual legs may be designed and fabricated via 3D printing or a molding and casting process. The current platform has its maximum speed of 0.3 m/sec. This may be acceptable for many applications but not for highspeed operations. Robot 100 requires relatively high-torque motors compared to a conventional wheeled robot counterpart. The developed platforms were intended to operate as part of a large swarm system, where individual robots are expected to be relatively small, inexpensive, and easy to maintain or repair while satisfying minimal locomotion objectives to operate in urban environments (e.g., traversing rough terrains and stairs). The wheel mechanisms are simple and modular to accommodate easy maintenance, repair, and replacement when needed. We used low-cost, off-the-shelf motors, which can achieve a high torque at a relatively low speed. Increasing the speed limit without sacrificing the torque typically increases the size and weight of the motor, and there is a trade-off to be considered. For example, a light-weight version of the robot may be equipped with high-speed, low-torque motors with reduced payload for agile locomotion.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an," and other singular terms are intended to include the plural forms thereof unless specifically excluded.

What is claimed is:

1. A robot comprising:
a body;
a wheel assembly coupled to the body, the wheel assembly comprising:
a central hub;
a central gear coupled to the central hub; and
a plurality of legs coupled to the central hub, the plurality of legs operatively coupled to the central gear such that the central gear drives the plurality of legs between a closed position and an open position, each leg of the plurality of legs comprising a torsion spring configured to bias the leg into the closed position and to absorb impacts when the leg is in the open position.

2. The robot of claim 1, wherein the wheel assembly comprises two legs.

3. The robot of claim 1, wherein the wheel assembly comprises three legs.

4. The robot of claim 1, wherein the wheel assembly comprises four legs.

5. The robot of claim 1, wherein the wheel assembly comprises five legs.

6. The robot of claim 1, wherein the wheel assembly comprises six legs.

7. The robot of claim 1, further comprising an autonomous guidance system that comprises:
a microcontroller;
a power source; and
a sensor suite.

8. The robot of claim 7, wherein the sensor suite further comprises:
a LiDAR device;
a GPS receiver; and
a camera.

9. The robot of claim 1, further comprising a spring-and-damper suspension system coupled to the body.

10. The robot of claim 1, wherein the central gear passively drives the plurality of legs between the closed position and the open position.

11. The robot of claim 1, comprising a locking mechanism that secures the plurality of legs in at least one of the closed position and the open position.

12. The robot of claim 11, wherein the locking mechanism is configured to be selectively released responsive to input from a user.

13. The robot of claim 11, wherein the locking mechanism is configured to be selectively released responsive to a signal from an autonomous guidance system.

14. The robot of claim 11, comprising an actuator coupled to a leg of the plurality of legs to selectively move the leg between the closed position and the open position in response to a signal from an autonomous guidance system.

15. The robot of claim 1, wherein at least one leg of the plurality of legs comprises a cavity that houses at least a portion of the torsion spring.

16. The robot of claim 15, wherein a first end of the torsion spring bears against an edge of the cavity and a second end of the torsion spring bears against a portion of the central hub.

17. The robot of claim 1, wherein each leg of the plurality of legs comprises a second torsion spring positioned on an opposite side of the leg from the torsion spring.

* * * * *